US010755289B2

(12) United States Patent
Seo et al.

(10) Patent No.: US 10,755,289 B2
(45) Date of Patent: Aug. 25, 2020

(54) ELECTRONIC DEVICE AND OPERATING METHOD THEREOF

(71) Applicant: Samsung Electronics Co., Ltd., Suwon-si (KR)

(72) Inventors: Seung-gi Seo, Seoul (KR); San-baek Kim, Seongnam-si (KR); Ho-hyeon Lee, Suwon-si (KR); Seung-ho Choi, Daegu (KR); Byeong-kyu Park, Seoul (KR); Ji-yeon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/896,719

(22) Filed: Feb. 14, 2018

(65) Prior Publication Data

US 2018/0285897 A1 Oct. 4, 2018

(30) Foreign Application Priority Data

Apr. 3, 2017 (KR) ........................ 10-2017-0043091

(51) Int. Cl.
*H04N 21/478* (2011.01)
*G06Q 30/02* (2012.01)
(Continued)

(52) U.S. Cl.
CPC ..... *G06Q 30/0201* (2013.01); *G06Q 30/0202* (2013.01); *H04N 21/42204* (2013.01); *H04N 21/47815* (2013.01); *H04N 21/812* (2013.01)

(58) Field of Classification Search
CPC ........... H04N 21/47815; H04N 21/254; H04N 21/812; H04N 21/42204; G06Q 30/0201; G06Q 30/0202
See application file for complete search history.

(56) References Cited

U.S. PATENT DOCUMENTS

| 2002/0056109 | A1* | 5/2002 | Tomsen | ................ | G06Q 30/06 |
| | | | | | 725/60 |
| 2003/0009759 | A1* | 1/2003 | Khoo | ............... | H04N 21/25883 |
| | | | | | 725/60 |

(Continued)

FOREIGN PATENT DOCUMENTS

| CN | 105323600 A | 2/2016 |
| KR | 2002-0013032 A | 2/2002 |

(Continued)

OTHER PUBLICATIONS

International Search Report dated Jun. 7, 2018 in corresponding Korean Patent Application No. PCT/KR2018/002434, 5 pgs.

(Continued)

*Primary Examiner* — Junior O Mendoza
(74) *Attorney, Agent, or Firm* — Staas & Halsey LLP

(57) ABSTRACT

Provided are an electronic device and an operating method thereof. The electronic device includes: a communication interface; a processor configured to output information of at least one product while a broadcast program for advertisement or sale is being displayed, control, in response to an external input for a selection from the information output, the communication interface to access a server storing shopping broadcast content produced for advertisement or sale corresponding to the selection, and output the shopping broadcast content received from the server by using streaming. The electronic device includes an external input interface configured to receive the external input.

19 Claims, 22 Drawing Sheets

(51) Int. Cl.
*H04N 21/422* (2011.01)
*H04N 21/81* (2011.01)

(56) References Cited

U.S. PATENT DOCUMENTS

| | | | |
|---|---|---|---|
| 2003/0084456 A1 | 5/2003 | Ryan et al. | |
| 2006/0282852 A1* | 12/2006 | Purpura | H04N 5/44543 725/39 |
| 2007/0106557 A1 | 5/2007 | Varghese | |
| 2007/0120840 A1 | 5/2007 | Johnson et al. | |
| 2008/0140532 A1* | 6/2008 | Johnson | G06Q 30/0601 705/14.19 |
| 2014/0359644 A1* | 12/2014 | Kumar | H04N 21/47815 725/5 |
| 2016/0205442 A1* | 7/2016 | Yee | G06Q 30/02 725/34 |
| 2016/0232587 A1* | 8/2016 | McDevitt | G06Q 30/0623 |
| 2018/0152764 A1* | 5/2018 | Taylor | H04N 21/47815 |

FOREIGN PATENT DOCUMENTS

| | | | |
|---|---|---|---|
| KR | 20020013032 A * | 2/2002 | ....... H04N 21/47815 |
| KR | 10-0614335 | 8/2006 | |
| KR | 10-2014-0087097 | 7/2014 | |
| KR | 10-1532593 | 6/2015 | |
| KR | 10-2016-0053206 | 5/2016 | |
| KR | 10-2016-0097780 | 8/2016 | |
| KR | 10-1651371 B1 | 8/2016 | |

OTHER PUBLICATIONS

Written Opinion of the International Searching Authority dated Jun. 7, 2018 in corresponding Korean Patent Application No. PCT/KR2018/002434, 7 pgs.
Mohshin Saleemi M. et al.: "System architecture and interactivity model mobile TV applications", Digital Interactive Media in Entertainment and Arts, ACM, 2 Penn Plaza, Suite 701, New York NY 10121-0701 USA, (Sep. 10, 2008), XP058133469 **
European Search Reporting dated Nov. 11, 2019 in European Patent Application No. 18780928.0.

* cited by examiner

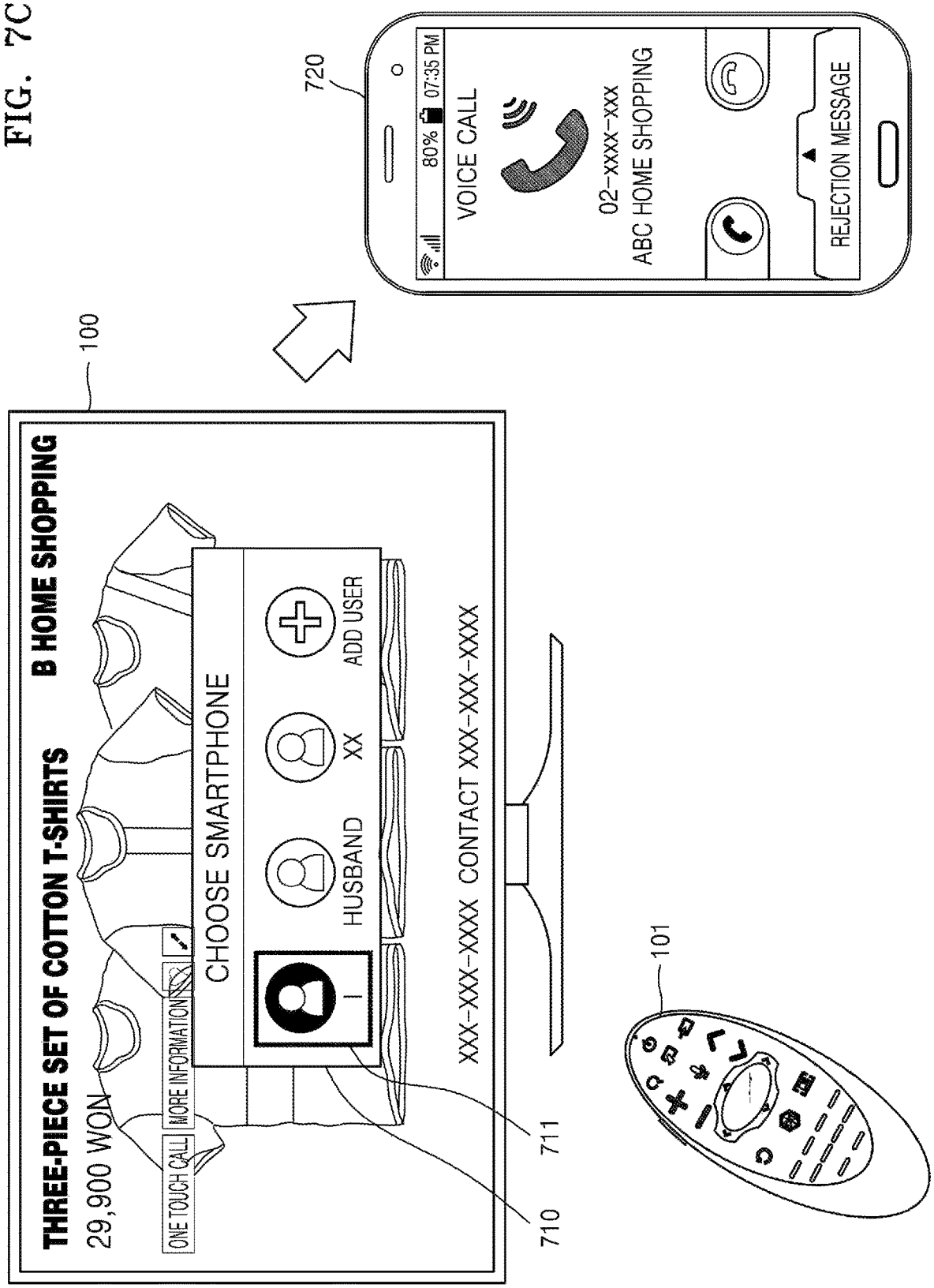

ELECTRONIC DEVICE AND OPERATING METHOD THEREOF

CROSS-REFERENCE TO RELATED APPLICATION

This application claims the benefit of Korean Patent Application No. 10-2017-0043091, filed on Apr. 3, 2017, in the Korean Intellectual Property Office, the disclosure of which is incorporated herein in its entirety by reference.

BACKGROUND

1. Field

The present disclosure relates to an electronic device and an operating method thereof, and more particularly, to an electronic device for providing information about a product and an operating method thereof.

2. Description of the Related Art

A user can view a broadcast through an electronic device. The electronic device outputs a broadcast selected by a user from among broadcast signals transmitted by a broadcast station. Currently, broadcasting has been changed worldwide from analog broadcasting to digital broadcasting.

Digital broadcasting refers to broadcasting digital images and audio signals. Compared with analog broadcasting, digital broadcasting is strong against external noise and has small data loss, is advantageous for error correction, has high resolution, and provides clear images. Also, unlike analog broadcasting, digital broadcasting can provide a bidirectional service.

Recently, in addition to a digital broadcasting function, a smart device such as a set-top box (STB), a television (TV), or the like, can be connected to various sources to reproduce various content or can receive an Over the top (OTT) service. To this end, there is need for a smart device capable of analyzing and providing a program desired by a user without a user's operation in order to eliminate a manual operation of a user to select a program.

SUMMARY

Provided are a device and a method that allow a user to conveniently compare pieces of home shopping broadcast content and easily view home shopping broadcast content about a desired product regardless of time.

Provided are a device and a method capable of continuously using pieces of home shopping broadcast content stored on a server by outputting home shopping broadcast content regarding products selected by a user from among the pieces of home shopping broadcast content stored on the server by streaming.

Additional aspects will be set forth in part in the description which follows and, in part, will be apparent from the description, or may be learned by practice of the presented example embodiments.

According to an aspect of an example embodiment, an electronic device includes: a communication interface; a processor configured to: output information of at least one product while a broadcast program for advertisement or sale is being displayed, control, in response to an external input for a selection from the information of the at least one product output, the communication interface to access a server storing shopping broadcast content produced for advertisement or sale of the corresponding to the selection, and output the shopping broadcast content received from the server by using streaming; and an external input interface configured to receive the external input.

The electronic device may further include a display, wherein the information of the at least one product is a product list, and the processor may further control the display to display the product list and the shopping broadcast content by using streaming.

The information of the at least one product is a product list which may include a plurality of product lists corresponding to products including the at least one product, wherein the plurality of product lists may include a first list including products currently being displayed on a plurality of home shopping broadcast channels, a second list including products that are sequentially broadcast on each home shopping broadcast channel, a third list including products corresponding to one or more predetermined product categories, and a fourth list including products selected according to a predetermined criterion from among products that have been broadcast.

The processor may determine an order in which the plurality of product lists are output, based on at least one of a user's viewing history and a user's purchase history, and may output the plurality of product lists in the determined order.

The processor may control the communication interface to access a server storing advertisement information about corresponding to the selection, and may receive and output the advertisement information corresponding to the selection from the server storing the advertisement information.

The processor may select an external device to receive a telephone call in response to the external input which includes a request for a telephone connection for a purchase through the external input interface according to the selection, and may control the communication interface to transmit a message requesting the telephone connection to a home shopping broadcast content provider so that the selected external device receives the telephone call for the purchase according to the selection.

The processor, in response to requesting request for a message including advertisement information associated with the selection through the external input interface, may control the communication interface to transmit the message to an external device.

The processor, in response to an input for selecting the at least one product or another product to be subject of a broadcast from the information of the at least one product through the external input interface, may output a notification message when broadcast involving the at least one product or the other product starts.

The processor may output the information of the at least one product using a thumbnail, and may output information about at least one of a name, a price, and a home shopping broadcast channel name of the at least one product along with the thumbnail.

The processor may execute an application in response to selecting of an application providing information about home shopping broadcast content through the external input interface, and may output the information of the at least one product as the application is executed.

The processor may output a menu to execute an application providing information about home shopping broadcast content when a user watches a home shopping broadcast program or a predetermined broadcast program, and may execute the application in response to selecting of the output menu through the external input interface.

According to an aspect of another example embodiment, an operating method of an electronic device includes: outputting, by the electronic device, information of at least one product while a broadcast program for advertisement or sale is being displayed; receiving, by the electronic device, an external input for product selection from the information of the at least one product output; accessing, in response to the external input, by the electronic device, a server storing shopping broadcast content produced for advertisement or sale corresponding to the selection; and outputting, by the electronic device, the shopping broadcast content received from the server by using streaming.

BRIEF DESCRIPTION OF THE DRAWINGS

These and/or other aspects will become apparent and more readily appreciated from the following description of the example embodiments, taken in conjunction with the accompanying drawings in which:

FIGS. 7A to 7C are views illustrating an example in which an electronic device according to an example embodiment transmits a message requesting a telephone connection for purchasing a product;

DETAILED DESCRIPTION

Figure 1:
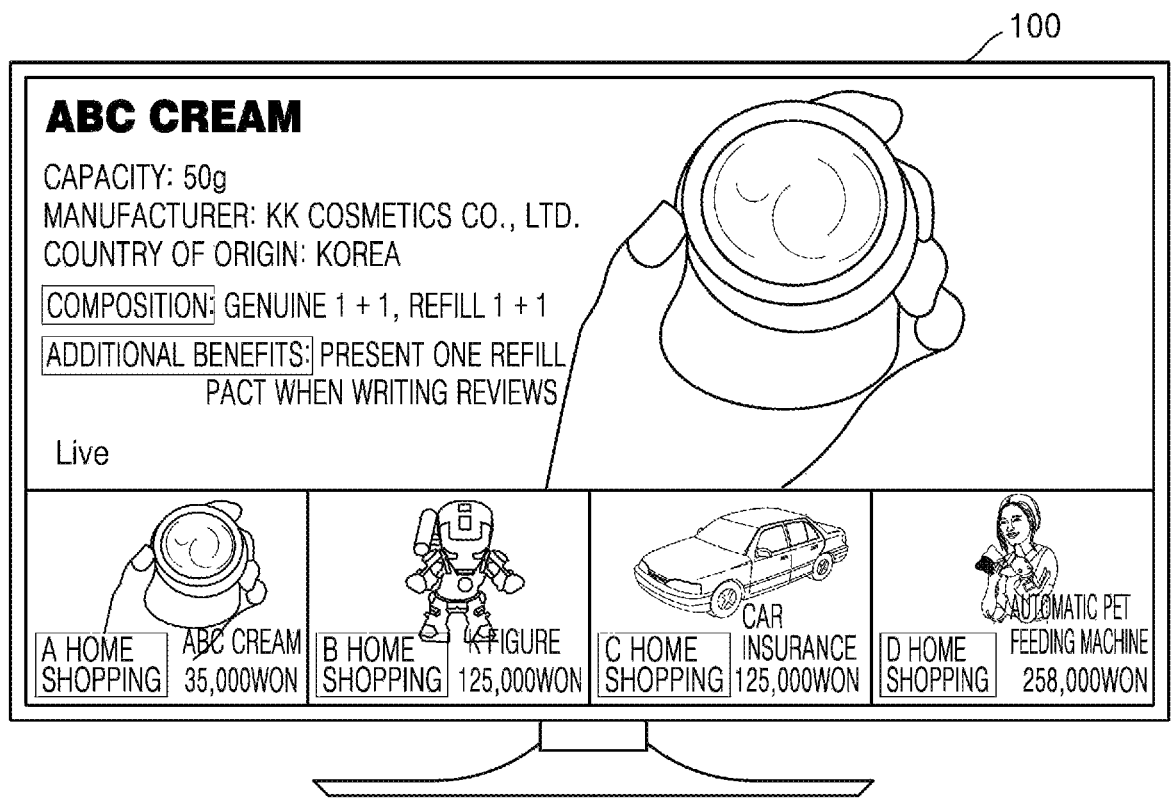
FIG. 1 is a view of an electronic device according to an example embodiment.
Figure 1:
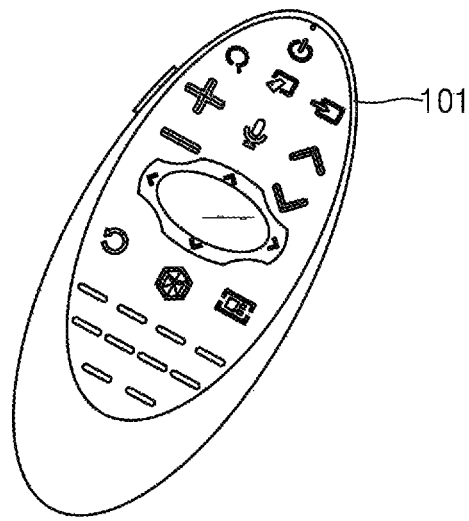

Reference will now be made in detail to example embodiments, examples of which are illustrated in the accompanying drawings. In this regard, the present disclosure may have different forms and should not be construed as being limited to the descriptions set forth herein. In addition, descriptions of well-known functions and constructions will be omitted for clarity and conciseness, and similar reference numerals are assigned to similar elements throughout the specification. As used herein, the term "and/or" includes any and all combinations of one or more of the associated listed items. Expressions such as "at least one of," when preceding a list of elements, modify the entire list of elements and do not modify the individual elements of the list.

General and widely used terms have been employed herein, in consideration of functions provided in the present disclosure, and may vary according to an intention of one of ordinary skill in the art, a precedent, or emergence of new technologies. Accordingly, it will be understood that the terms used herein should be interpreted as having a meaning that is consistent with their meaning in the context of the relevant art and will not be interpreted in an idealized or overly formal sense unless expressly so defined herein.

Furthermore, the terms used in the present disclosure will only been used for the purpose of describing particular embodiments, and are not used with intent to limit the present disclosure. As used herein, the singular forms "a", "an", and "the" are intended to include the plural forms as well, unless the context clearly indicates otherwise. Throughout the specification, "communication" includes communication by a unidirectional communication standard and a bidirectional communication standard, and it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicates.

The use of the terms "a", "an", and "the" and similar referents in the context of describing the specification (especially in the context of the following claims) are to be construed to cover both the singular and the plural. Also, the steps of all methods described herein can be performed in any suitable order unless otherwise indicated herein or otherwise clearly contradicted by context. The present disclosure is not limited to the described order of the steps.

Phrases such as "in some example embodiments" or "in an example embodiment" appearing in various places in the specification are not necessarily all referring to the same example embodiment.

Some example embodiments of the present disclosure may be represented by the functional block configurations and various processing steps. Some or all of these functional blocks may be implemented in hardware and/or software configuration of the various number of executing a particular function. For example, the functional blocks of the present disclosure may be implemented by one or more microprocessors, or by circuit configurations for a predetermined function. Also, for example, the functional blocks of the present disclosure may be implemented in various programming or scripting languages. Functional blocks may be realized by algorithms executed in more than one processor. In addition, the present disclosure may adopt related-art technology for electronic environment set-up, signal processing, and/or data processing, etc. Terms such as "factor", "element", "unit" and "formation" may be widely used, and not limited to mechanical and physical formations.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the present disclosure will be described in detail with reference to the accompanying drawings.

FIG. 1 is a view of an electronic device 100 according to an example embodiment.

Referring to FIG. 1, the electronic device 100 may be, but is not limited to, a television (TV), and may include a processor and a communication interface. For example, the electronic device 100 may be a cellular phone, a tablet personal computer (PC), a digital camera, a camcorder, a laptop computer, a desktop computer, an e-book terminal, a terminal for digital broadcasting, a personal digital assistant (PDA), a portable multimedia player (PMP), a navigation, an MP3 player, or a wearable device. In addition, the electronic device 100 may be a fixed type or a mobile type, and may also be a digital broadcasting receiver capable of receiving digital broadcasting.

Also, the electronic device 100 may further include a display. According to an example embodiment, the electronic device 100 may be a flat display device, a curved display device having a curved screen, or a flexible display with adjustable curvature. An output resolution of the electronic device 100 may be, for example, High Definition (HD) resolution, Full HD resolution, Ultra HD resolution, or higher resolution than the Ultra HD.

Furthermore, according to an example embodiment, the electronic device 100 may include a set-top box or an IP set-top box. The set-top box or IP set-top box may provide a multimedia communication service on an external network. The set-top box or IP set-top box may be connected to an external image display device to provide broadcast content.

The electronic device 100 may be controlled by a control device 101 and the control device 101 may be a remote control or a cellular phone for controlling the electronic device 100. Alternatively, when a display of the electronic device 100 is a touch screen, the control device 101 may be a user's finger, an input pen, or the like.

In addition, the control device 101 may control the electronic device 100 via short-range communication such as infrared communication or Bluetooth. The control device 101 may control functions of the electronic device 100 using at least one of a key (including a button), a touch pad, an image capturing device capable of capturing an image, a microphone (not shown) capable of receiving user's audio signal, and a sensor (not shown) capable of detection motion of the control device 101, which are all provided in the control device 101.

The control device 101 may include a power on/off button for turning on or off the electronic device 100. The control device 101 may change channels of the electronic device 100, adjust a volume, select a terrestrial broadcast/cable broadcast/satellite broadcast, or set an environment by a user input. Also, the control device 101 may be a pointing device. For example, the control device 101 may operate as a pointing device when receiving a specific key input.

In example embodiments of the specification, the term "user" refers to a person who controls functions or operations of the electronic device 100 using the control device 101, and may include a viewer, a manager, or an installer.

As home shopping broadcast content that users can view is diversified, there is a need for a method that enables users to easily compare and watch different home shopping broadcast content. In addition, there is a need for a method of using pieces of home shopping broadcast content stored on a server in the form of a video file, as pre-produced home shopping broadcast content increases. Recently, a home shopping service is not provided simply via a TV, but is provided in connection with an Internet service and mobile device. Accordingly, there is a need for a method of providing a more convenient home shopping service to a user by using the Internet service and the mobile device.

The electronic device 100 according to an example embodiment may output a product list including a plurality of products and output produced home shopping broadcast content for advertisement or sale of a product selected from the output list. Accordingly, the electronic device 100 allows a user to check pieces of home shopping broadcast content currently being displayed in real time at a time. In addition, the electronic device 100 allows a user to conveniently compare pieces of home shopping broadcast content and to easily view home shopping broadcast content regarding a desired product regardless of the time.

Figure 2:
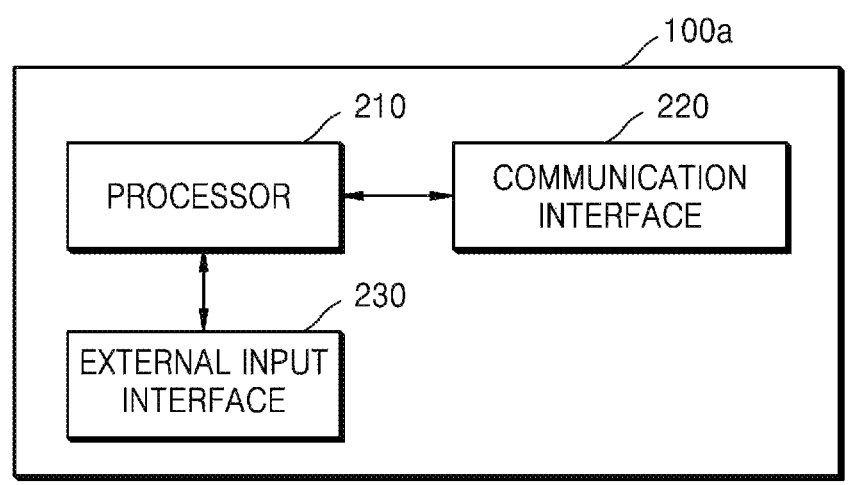
FIG. 2 is a block diagram of a configuration of an electronic device according to an example embodiment.

FIG. 2 is a block diagram of a configuration of an electronic device 100a according to an example embodiment.

Referring to FIG. 2, the electronic device 100a may include a processor 210, a communication interface 220, and an external input interface 230. However, the number of components of the electronic device 100a may be greater than that illustrated in FIG. 2.

Hereinafter, the components will be sequentially described.

The processor 210 may include one or more memories and one or more processors. For example, a memory may create and delete program modules according to operations of the processor 210, and the processor 210 may process operations of the program module.

The processor 210 according to an example embodiment outputs a product list including a plurality of products while a broadcast program for advertisement or sale of a product is being displayed. The broadcast program for advertisement or sale of a product may include, but is not limited to, a shopping broadcast program such as a home shopping broadcast program or a program for providing information about a recommended product. The broadcast program for advertisement or sale of a product may be a program authorized by a broadcast program provider to output information of a product, for example, a product list including a plurality of products while the broadcast program is being displayed.

The product list including information of a plurality of products may include a product advertised or sold through a broadcast content such as home shopping broadcast content. Furthermore, according to an example embodiment, the product list may include a plurality of product lists. For example, the plurality of product lists may include a first list including products currently being displayed on a plurality of home shopping broadcast channels, a second list including products that are sequentially broadcast on each home shopping broadcast channel, a third list including products corresponding to one or more predetermined product categories, and a fourth list including products selected according to a predetermined criterion from among products that have been broadcast. While the information of a product is explained using a product list as an example, the present invention is not limited to any particular format of outputting information of product(s).

The processor 210 according to an example embodiment may determine an order in which a plurality of product lists are output, based on at least one of a user's viewing and/or interest history and a user's purchase history. In addition, the processor 210 may output a plurality of product lists in the determined order. For example, when a user views a second home shopping broadcast channel more frequently than a first home shopping broadcast channel, the processor 210 may output a product list including products broadcast on the second home shopping broadcast channel to the top of a product list including products broadcast on the first home shopping broadcast channel. In addition, for example, when a user is more likely to purchase products in a fashion category from among a plurality of predetermined product categories, the processor 210 may output at the top a list including products corresponding to the fashion category.

The processor 210 according to an example embodiment may output a product list using a thumbnail of each product. Furthermore, the processor 210 may output information about at least one of a name, a price, and a home shopping broadcast channel name of each product along with the thumbnail. Accordingly, the processor 210 may allow a user to easily identify information about a product included in the product list.

The processor 210 according to an example embodiment, in response to an external input for selecting a product from the product list, controls the communication interface 220 to access a server storing home shopping broadcast content produced for advertisement or sale of the selected product. The home shopping broadcast content may be produced in advance by a home shopping broadcast content provider (for example, a home shopping broadcasting company) and stored on the server. The home shopping broadcast content stored on the server may include content that has been broadcast, content currently being displayed, and content to be broadcast.

The processor 210 according to an example embodiment displays home shopping broadcast content received from the server by using streaming.

For example, the processor 210 may receive home shopping broadcast content regarding a product selected from the product list from the server, and may display the received home shopping broadcast content by using streaming. Accordingly, the processor 210 may output the home shopping broadcast content regarding the product selected by a user using streaming. Therefore, the processor 210 may provide a method of continuously using pieces of home shopping broadcast content stored on the server by outputting the home shopping broadcast content regarding the product selected by a user using streaming.

Furthermore, the processor 210 may display home shopping broadcast content by using streaming and output advertisement information about the product at the same time. The advertisement information about the product may include at least one of a name, a price, a brand, and a description of the product. In addition, the advertisement information about the product may be stored on a server other than the server storing home shopping broadcast content. For example, the server storing home shopping broadcast content may be a server of a home shopping broadcast content provider, and the server storing the advertisement information about the product may be a server of a service provider related to the home shopping broadcast content, but are not limited thereto. The server of the service provider may receive the advertisement information about the product from the home shopping broadcast content provider. For example, the server of the service provider may receive the advertisement information about the product from the home shopping broadcast content provider, and may process the received advertisement information about the product. The server of the service provider may process the advertisement information about the product so as to be output together with home shopping broadcast content output through the electronic device 100a.

The communication interface 220 according to an example embodiment may access the server storing home shopping broadcast content produced for advertisement or sale of a product selected from a product list under the control of the processor 210 to receive the home shopping broadcast content.

In addition, the communication interface 220 according to an example embodiment may access the server storing advertisement information about a product under the control of the processor 210 to receive the advertisement information about a product.

Furthermore, the communication interface 220 may transmit a message requesting a telephone connection for purchasing a selected product to the home shopping broadcast content provider so that a user's external device may receive a telephone call for purchasing the selected product. In addition, the communication interface 220, in response to an external input for requesting a message including advertisement information about a selected product, may transmit a message including advertisement information about a product selected from a product list to the external device.

The external input interface 230 according to an example embodiment may be a unit by which a user inputs data for controlling the electronic device 100a. For example, the external input interface 230 may include a keypad, a dome switch, a touch pad, a jog wheel, a jog switch or the like, but is not limited thereto.

Furthermore, the external input interface 230 may be a component of the control device 101, or may be a component of the electronic device 100a.

The external input interface 230 according to an example embodiment may receive an external input for selecting a product from a product list. When the external input interface 230 includes a key pad or a dome switch, an external input for selecting a product from a product list displayed on a display 360 may be input for clicking or pressing a key corresponding to a specific direction. Alternatively, when the external input interface 230 includes a touch pad, the input may be input for touching a key corresponding to a specific direction, but the present disclosure is not limited thereto.

The external input interface 230 according to an example embodiment may receive an external input for requesting a telephone connection for purchasing a selected product and receive an external input for requesting a message including advertisement information about the selected product. Also, the external input interface 230 may receive an external input for selecting a product to be broadcast from a product list.

In addition, the external input interface 230 according to an example embodiment may receive an external input for selecting an application for providing information about home shopping broadcast content.

Figure 3:
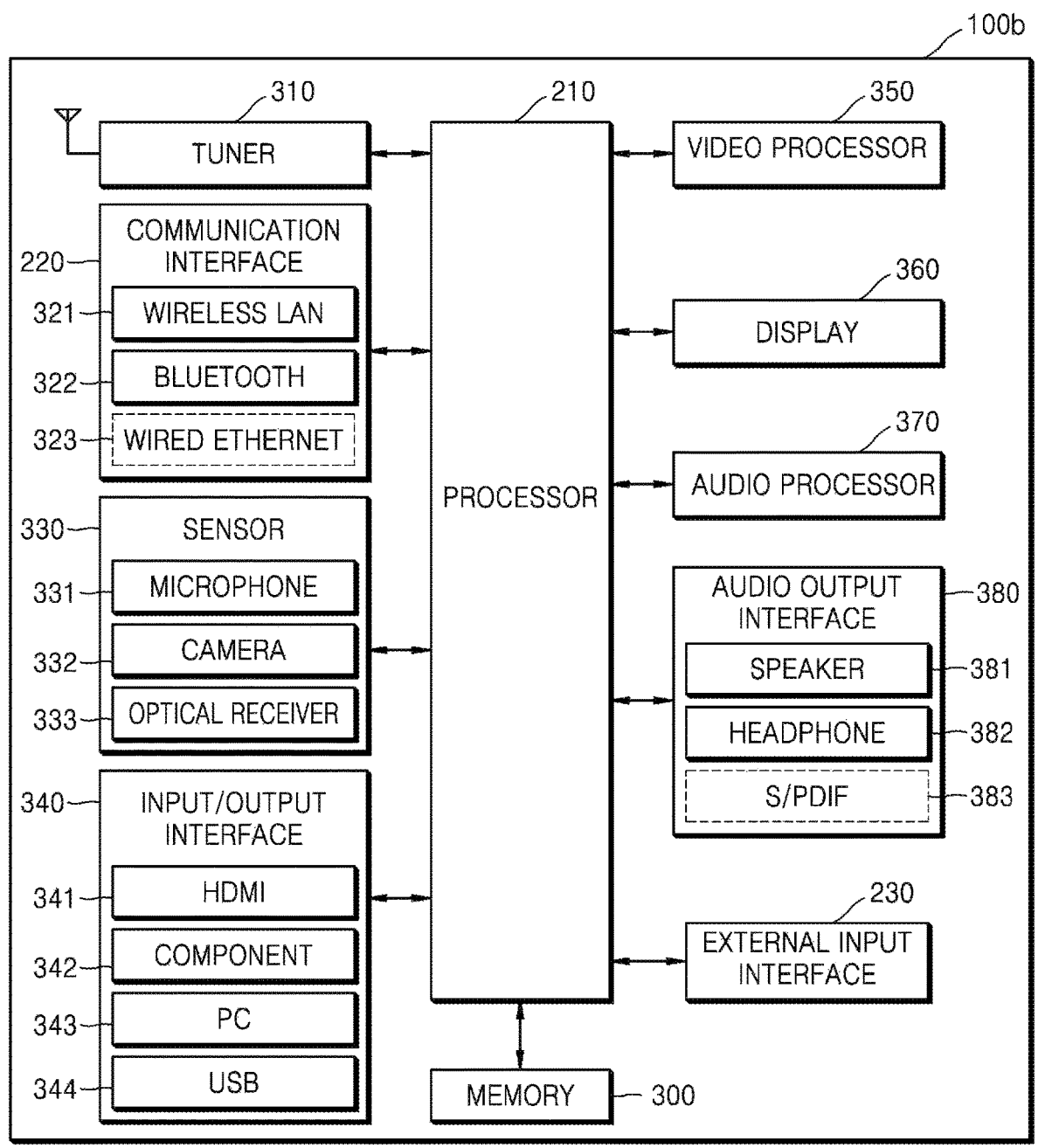
FIG. 3 is a block diagram of a configuration of an electronic device according to another example embodiment.

FIG. 3 is a block diagram of a configuration of an electronic device 100b according to another example embodiment.

As illustrated in FIG. 3, the electronic device 100b may further include a memory 300, a tuner 310, a sensor 330, an input/output interface 340, a video processor 350, a display 360, an audio processor 370, and an audio output interface 380 in addition to the processor 210, the communication interface 220, and the external input interface 230.

Since the processor 210, the communication interface 220, and the external input interface 230 have already been described above in FIG. 2, repeated descriptions thereof will not be given in FIG. 3.

The tuner 310 may select only a frequency of a channel to be received from the electronic device 100b from among many electric wave components by tuning the frequency through amplification, mixing, resonance, etc. of a broadcast signal received in a wired or wireless manner. The broadcast signal includes audio, video and additional information (for example, an electronic program guide (EPG)).

A broadcast signal received through the tuner 310 is decoded (for example, audio decoding, video decoding, or additional information decoding) and separated into audio, video and/or additional information. The separated audio, video and/or additional information may be stored on the memory 300 under the control of the processor 210. The tuner 310 of the electronic device 100b may be one or more. The tuner 310 may be integrated with the electronic device 100b or may be a separate device having a tuner electrically connected to the electronic device 100b, or a tuner (not shown) connected to the input/output interface 340.

The communication interface 220 may connect the electronic device 100b to an external device (e.g., an audio device, an image display device) under the control of the processor 210. The processor 210 may exchange content with the external device connected through the communication interface 220, download an application from the external device, or perform web browsing.

The communication interface 220 may include one of a wireless LAN 321, a Bluetooth 322, and a wired Ethernet 323 corresponding to performance and a structure of the electronic device 100b. The communication interface 220 may include a combination of the wireless LAN 321, the Bluetooth 322, and the wired Ethernet 323. The communication interface 220 may receive a control signal of the control device 101 under the control of the processor 210. The control signal may be a Bluetooth type, a radio frequency (RF) signal type, or a WiFi type. The communication interface 220 may further include short-range communication (for example, near field communication (NFC) (not shown), and Bluetooth low energy (BLE) (not shown) other than Bluetooth.

The sensor 40 may include a microphone 331, a camera 332, and an optical receiver 333, and may sense user's audio signal, a user's image, or a user's interaction.

The microphone 331 receives user's utterance. The microphone 331 may convert the received utterance into an electrical signal and output the electrical signal to the processor 210.

The camera 332 may receive an image (for example, a continuous frame) corresponding to user motion including a gesture in a camera recognition range.

The optical receiver 333 receives an optical signal (including a control signal) received from an external control device. The optical receiver 333 may receive an optical signal corresponding to a user input (e.g., touch, press, touch gesture, voice, or motion) from the control device. A control signal may be extracted from the received optical signal under the control of the processor 210.

According to an example embodiment, the optical receiver 333 may receive an optical signal corresponding to an input for selecting a product from a product list from the control device 101. Furthermore, the optical receiver 333 may receive an optical signal corresponding to an input for requesting a telephone connection for purchasing a product. Furthermore, the optical receiver 333 may receive an optical signal corresponding to an input for selecting a menu for executing an application for providing information about home shopping broadcast content.

The input/output interface 340 receives video (e.g., a moving picture, etc.), audio (e.g., voice, music, etc.), and additional information (e.g., an EPG, etc.) from the outside of the electronic device 100b under the control of the processor 210. The input/output interface 340 may include one of an HDMI 341 (an HDMI port), a component 342 (a component jack), a PC 343 (a PC port), and a universal serial bus (USB) 344 (USB port). The input/output interface 340 may include a combination of the HDMI 341, the component 342, the PC 343, and the USB 344.

The video processor 350 may process an image to be displayed by the display 360, and may perform various image processing, such as decoding, scaling, noise filtering, a frame rate conversion, or a resolution conversion, on the video data.

The display 360 may display a video included in a broadcast signal received through the tuner 310 on a screen under the control of the processor 210. In addition, the display 360 may display content (for example, a video) input through the communication interface 220 or the input/output interface 340. The display 360 may output an image stored on the memory 300 under the control of the processor 210.

The display 360 according to an example embodiment may display a product list including a plurality of products while a broadcast program for advertisement or sale of a product is being displayed under the control of the processor 210. The display 360, in response to an external input for selecting a product from the product list, may display home shopping broadcast content produced for advertisement or sale of a product under the control of the processor 210. The display 360 may display home shopping broadcast content and advertisement information about the selected product at the same time.

Furthermore, the display 360 may display a menu for executing an application providing information about home shopping broadcast content when a user watches a home shopping broadcast program or a predetermined program.

When the display 360 and a touch pad form a layer structure and then are formed as a touch screen, the display 360 may be used as both an output device and an input device. The display 360 may include at least one of a liquid crystal display (LCD), a thin film transistor-LCD (TFT-LCD), an organic light-emitting diode (OLED) display, a flexible display, a three-dimensional (3D) display, and an electrophoretic display. Also, according to a type of the electronic device 100b, the electronic device 100b may include at least two displays 360. Here, the at least two displays 360 may be disposed to face each other by using a hinge.

The audio processor 370 performs processing on audio data. The audio processor 370 may perform various processing, such as decoding, amplification, or noise filtering, on the audio data.

The audio output interface 380 may output an audio included in a broadcast signal received through the tuner 310, an audio input through the communication interface 220 or the input/output interface 340, and an audio stored on the memory 300, under the control of the processor 210. The audio output interface 380 may include at least one of a speaker 381, a headphone 382 (a headphone output terminal), and a Sony/Philips digital interface (S/PDIF) output terminal 383.

The memory 300 according to an example embodiment may store a program for processing and controlling the processor 210, and may store data that is input or output to/from the electronic device 100b.

The memory 300 may include at least one type of storage medium from among memory of a flash memory type, a hard disk type, a multimedia card micro type or a card type (for example, SD or XD memory), random access memory (RAM), static random access memory (static RAM), read-only memory (ROM), electrically erasable programmable read-only memory (EEPROM), programmable ROM (PROM), magnetic memory, a magnetic disk, or an optical disk.

The memory 300 according to an example embodiment may store at least one instruction of outputting a product list including a plurality of products while a broadcast program for advertisement or sale of a product is being displayed, accessing a server storing home shopping broadcast content produced for advertisement or sale of a selected product in response to an external input for selecting the product from the product list, and displaying home shopping broadcast content received from the server by using streaming.

The processor 210 controls all operations of the electronic device 100b and a signal flow between internal components of the electronic device 100b and performs data processing. The processor 210 may operate based on an operating system (OS) and also execute various applications stored on the memory 300 upon receipt of a user input or according to predetermined conditions.

The processor 210 according to an example embodiment may output a product list including a plurality of products while a broadcast program for advertisement or sale of a product is being displayed, control the communication interface 220 to access a server storing home shopping broadcast content produced for advertisement or sale of a selected product in response to an external input for selecting the product from the product list, and display the home shopping broadcast content received from the server by using streaming, by performing instruction stored on the memory 300.

Meanwhile, the block diagrams of the electronic devices 100a and 100b illustrated in FIGS. 2 and 3 are for one example embodiment. Each component of the block diagrams may be integrated, added, or omitted, depending on specifications of the electronic devices 100a and 100b that are actually implemented. For example, two or more components may be combined into one component as needed, or one component may be divided into two or more components. In addition, functions performed in each block are intended to describe example embodiments, and a specific operation or device does not limit the scope of the present disclosure.

Figure 4:
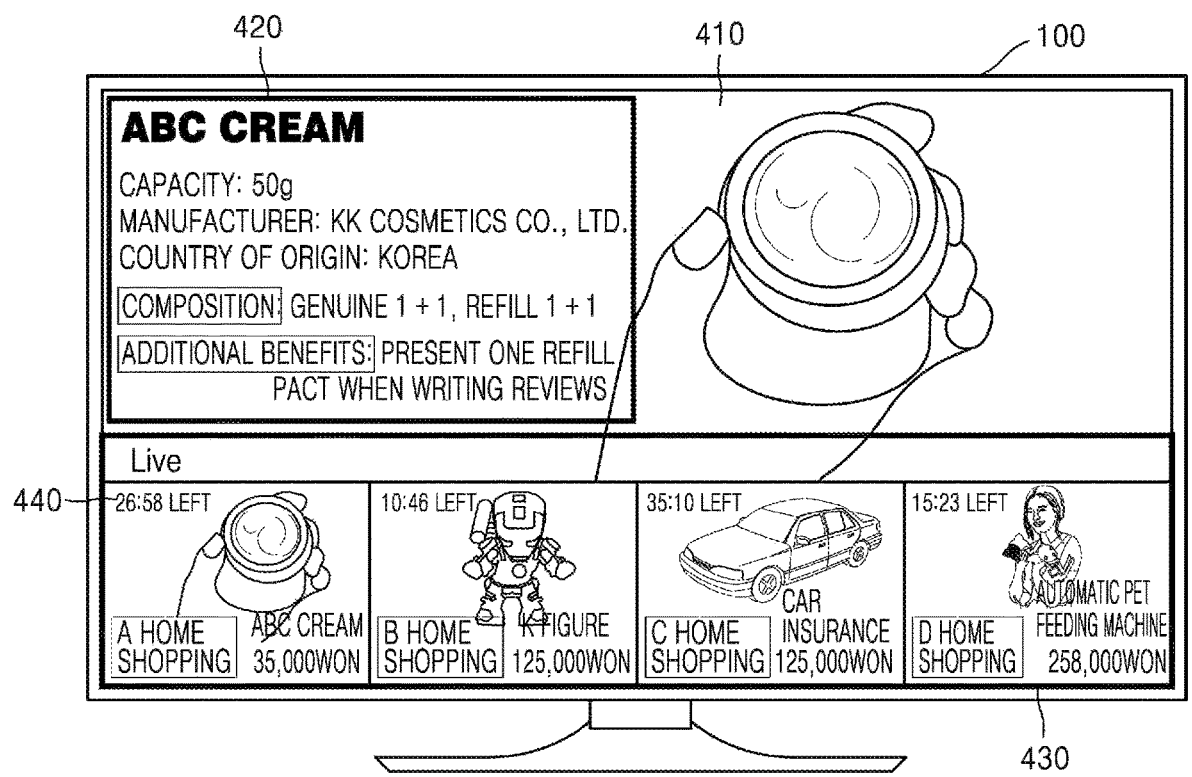
FIG. 4 is a view illustrating an example in which an electronic device according to an example embodiment outputs home shopping broadcast content.

FIG. 4 is a view illustrating an example in which the electronic device 100 according to an example embodiment outputs home shopping broadcast content.

The electronic device 100 according to an example embodiment may output a product list including a plurality of products while a broadcast program for advertisement or sale of a product is being displayed. For example, referring to FIG. 4, the broadcast program for advertisement or sale of a product may include, but is not limited to, a program broadcast through a home shopping channel or a program for providing information about a recommended product.

A product list 430 may include a plurality of product lists according to product characteristics. For example, as illustrated in FIG. 4, the product list 430 may include a first list including products currently being displayed on a plurality of home shopping broadcast channels. The product list 430 may also include, but is not limited to, at least one of a second list including products that are sequentially broadcast on each home shopping broadcast channel, a third list including products corresponding to one or more predetermined product categories (e.g., clothing, cosmetics, sporting goods, kitchenware, etc.), and a fourth list including products (e.g., 10 popular items from last week and 20 popular women's fashion items, etc.) selected according to a predetermined criterion from among products that have been broadcast. Detailed descriptions of the product list will be described later below with reference to FIGS. 6A and 6B.

The electronic device 100 according to an example embodiment may display shopping broadcast content 410 such as home shopping broadcast content produced for advertisement or sale of a selected product using streaming as a product is selected from the product list 430. For example, home shopping broadcast content, which is content produced by a home shopping broadcast content provider in advance, may be stored on a server of the content provider. The home shopping broadcast content stored on the home shopping broadcast server may include all of home shopping broadcast content regarding a product that has been broadcast, information of a product currently being displayed, and/or information of a product to be broadcast. Furthermore, the electronic device 100 may output the home shopping broadcast content stored on the server of the content provider using streaming. Therefore, even if the product that has been broadcast is selected, the electronic device 100 may output home shopping broadcast content regarding the selected product using streaming. Accordingly, the electronic device 100 provides a method of continuously using pieces of home shopping broadcast content stored on the server of the content provider.

The electronic device 100 may select a product from the product list 430 by receiving an external input for selecting a predetermined product from the control device 101. In addition, according to an example embodiment, when a focus is located in specific content for a predetermined time, the electronic device 100 determines that the content is selected, and may output home shopping broadcast content regarding the selected content.

The electronic device 100 according to an example embodiment may output advertisement information 420 related to a selected product together with the shopping broadcast content 410. For example, referring to FIG. 4, the electronic device 100 may output the advertisement information 420 related to the selected product together with the shopping broadcast content 410 output using streaming. The advertisement information 420 related to the selected product may include, but is not limited to, at least one of a product name, capacity, a manufacturer, a country of origin, a product configuration, and discount information.

Furthermore, the electronic device 100 according to an example embodiment may simultaneously output remaining broadcast time of home shopping broadcast content for each product while outputting a product list including products currently being displayed on a plurality of home shopping broadcast channels. For example, referring to FIG. 4, the electronic device 100 may output a product list including products currently being displayed on A home shopping broadcast channel, B home shopping broadcast channel, C home shopping broadcast channel, and D home shopping broadcast channel. Also, the electronic device 100 may output remaining broadcast time (e.g., 26 minutes 58 seconds) 440 of home shopping broadcast content regarding "ABC cream" currently being displayed on the A home shopping channel. As another example, the electronic device 100 may output remaining broadcast time (e.g., 10 minutes 46 seconds) of home shopping broadcast content regarding "K figure" currently being displayed on the B home shopping channel. Accordingly, the electronic device 100 allows a user to more easily check remaining broadcast time of home shopping broadcast content currently being displayed.

The electronic device 100 according to an example embodiment may provide a product list including products currently being displayed on a plurality of home shopping broadcast channels and may output home shopping broadcast content regarding a product selected from the product list using streaming. Accordingly, the electronic device 100 allows a user to easily identify and compare products introduced on a plurality of home shopping broadcast channels.

Figure 5A:
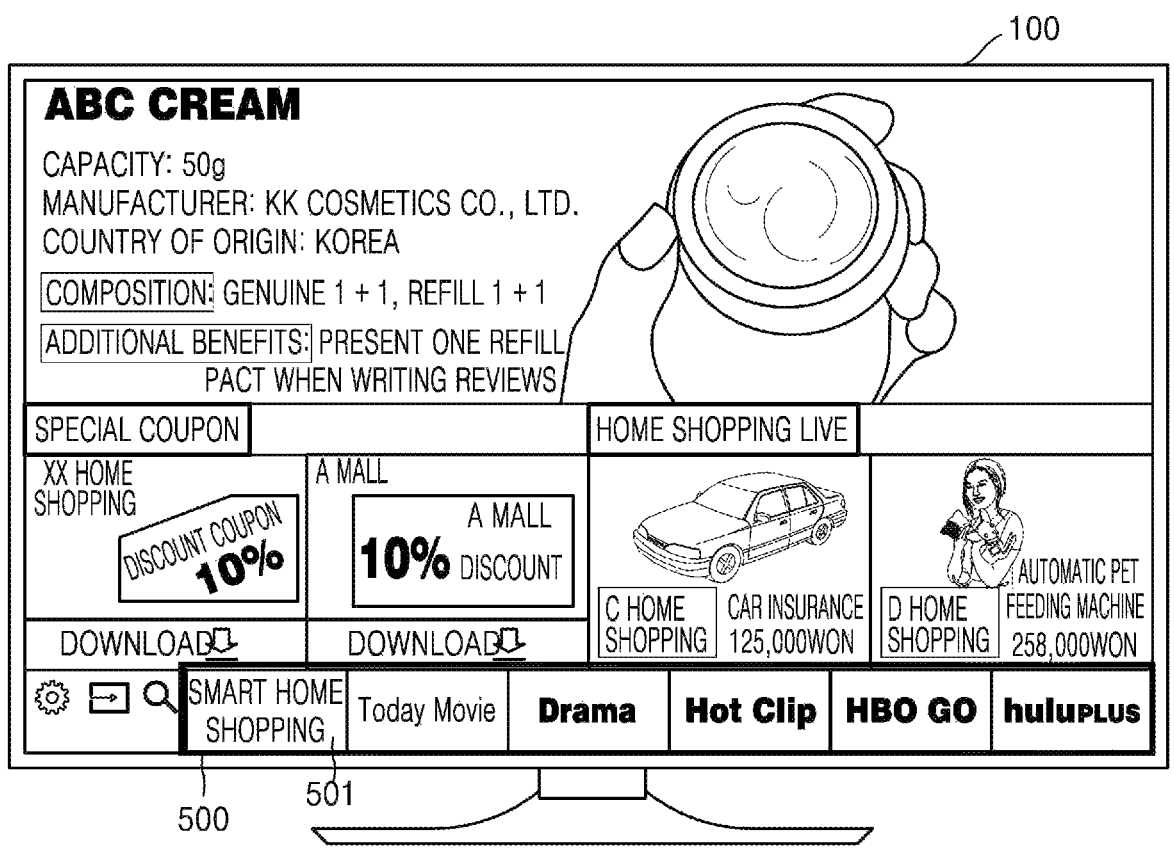
FIGS. 5A to 5C are views illustrating an example in which an electronic device according to an example embodiment executes an application that provides information about home shopping broadcast content.
Figure 5B:
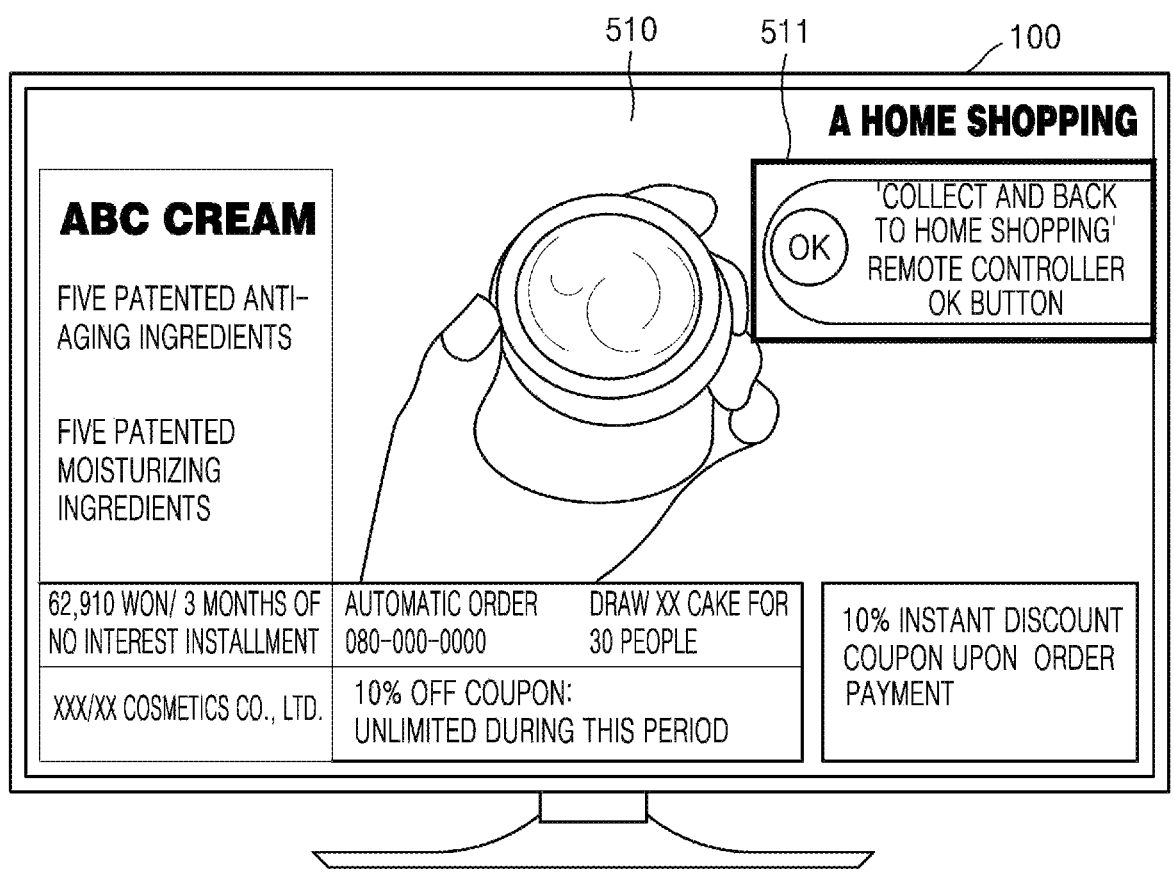
Figure 5C:
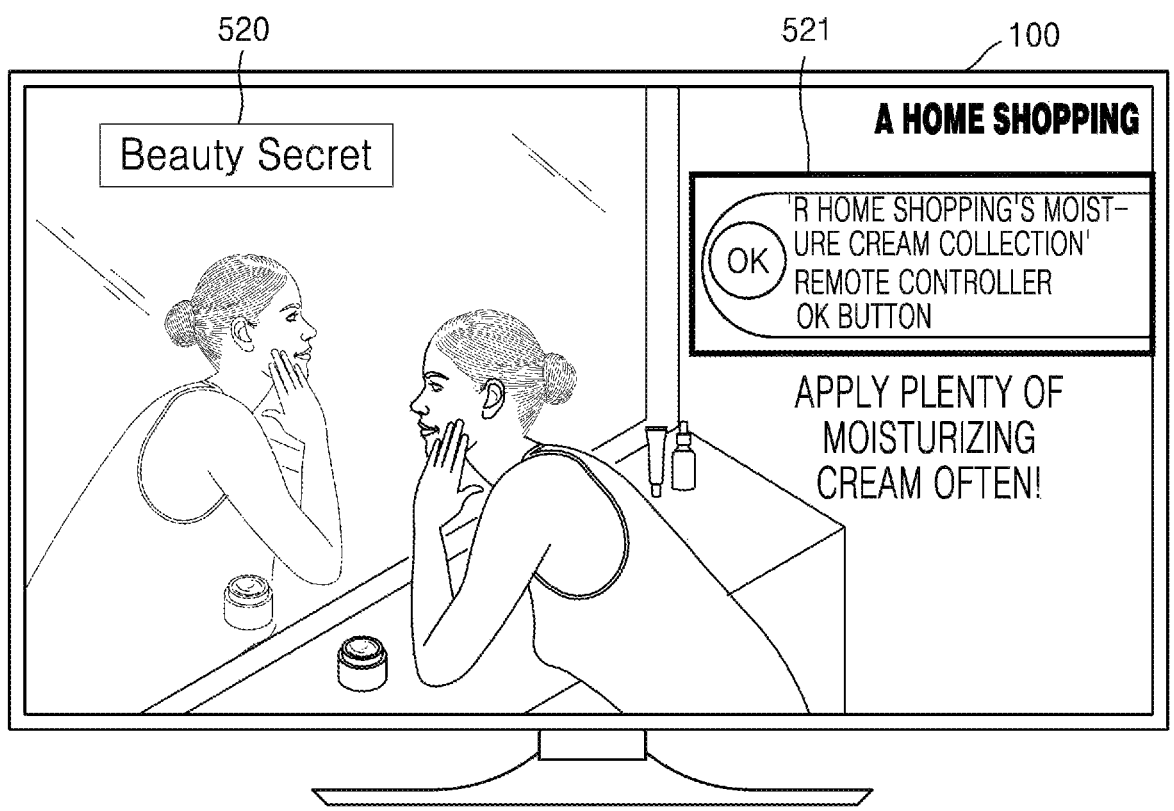

FIGS. 5A to 5C are views illustrating an example in which the electronic device 100 according to an example embodiment executes an application that provides information about home shopping broadcast content.

The electronic device 100 according to an example embodiment may output a product list including a plurality of products through an application that provides information about home shopping broadcast content and may further output home shopping broadcast content regarding a product selected from the product list using streaming. For example, referring to FIG. 5, the electronic device 100 may output a menu 500 indicating a plurality of services provided in the electronic device 100. For example, the electronic device 100 may provide a video streaming service, a home shopping related service, a movie and a drama playback service, and the like, but is not limited thereto. In addition, the electronic device 100 may execute a corresponding application in response to an external input for selecting a menu 501 for executing an application for providing information about home shopping broadcast content in the output menu 500.

When the application for providing a home shopping broadcasting-related service is executed, the electronic device 100 may output at least a product list including a plurality of products and may further output home shopping broadcast content regarding a product selected from the product list using streaming as shown in FIG. 4. Accordingly, a user may conveniently view pieces of home shopping broadcast content by selecting the menu 501 indicating the application and executing the application.

Furthermore, the electronic device 100 according to an example embodiment may output a menu for executing an application for providing information about home shopping broadcast content when a user watches a broadcast program for advertisement or sale of a product. For example, the broadcast program for advertisement or sale may be of a product and may include, but is not limited to, a home shopping broadcast program or a program for providing information about a recommended product. Furthermore, the broadcast program for advertisement or sale of a product may be a program authorized by a broadcast program provider to output a menu for executing the application while the broadcast program is being viewed.

For example, referring to FIG. 5B, the electronic device 100 may output a menu 511 for executing an application for providing information about home shopping broadcast content when a user watches a home shopping broadcast program 510. Furthermore, the electronic device 100 may execute the application for providing information about home shopping broadcast content in response to an external input for selecting the menu 511. As the application is executed, the electronic device 100 may output a product list including a plurality of products and may further output home shopping broadcast content regarding a product selected from the product list using streaming.

As another example, referring to FIG. 5C, the electronic device 100 may output a menu 521 for executing an application for providing information about home shopping broadcast content when a user watches a program 520 for providing information about a recommended product. Furthermore, the electronic device 100 may execute the application for providing information about home shopping broadcast content in response to an external input for selecting the menu 521. Accordingly, the electronic device 100 may provide various methods for executing the application such that a user can more conveniently use the application for providing information about home shopping broadcast content when necessary.

Figure 6A:
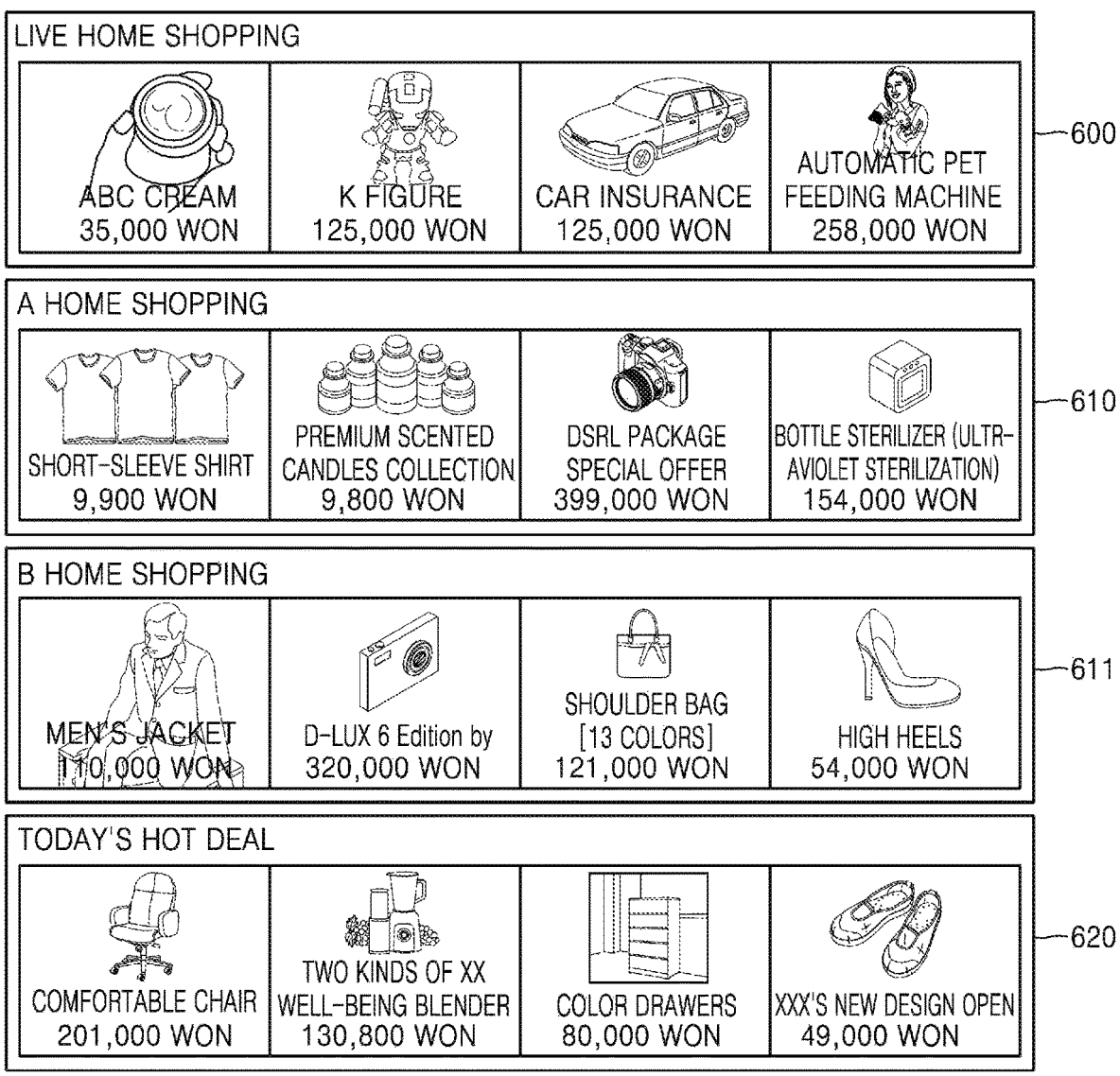
FIGS. 6A and 6B are views for explaining a product list output by an electronic device, according to an example embodiment.
Figure 6B:
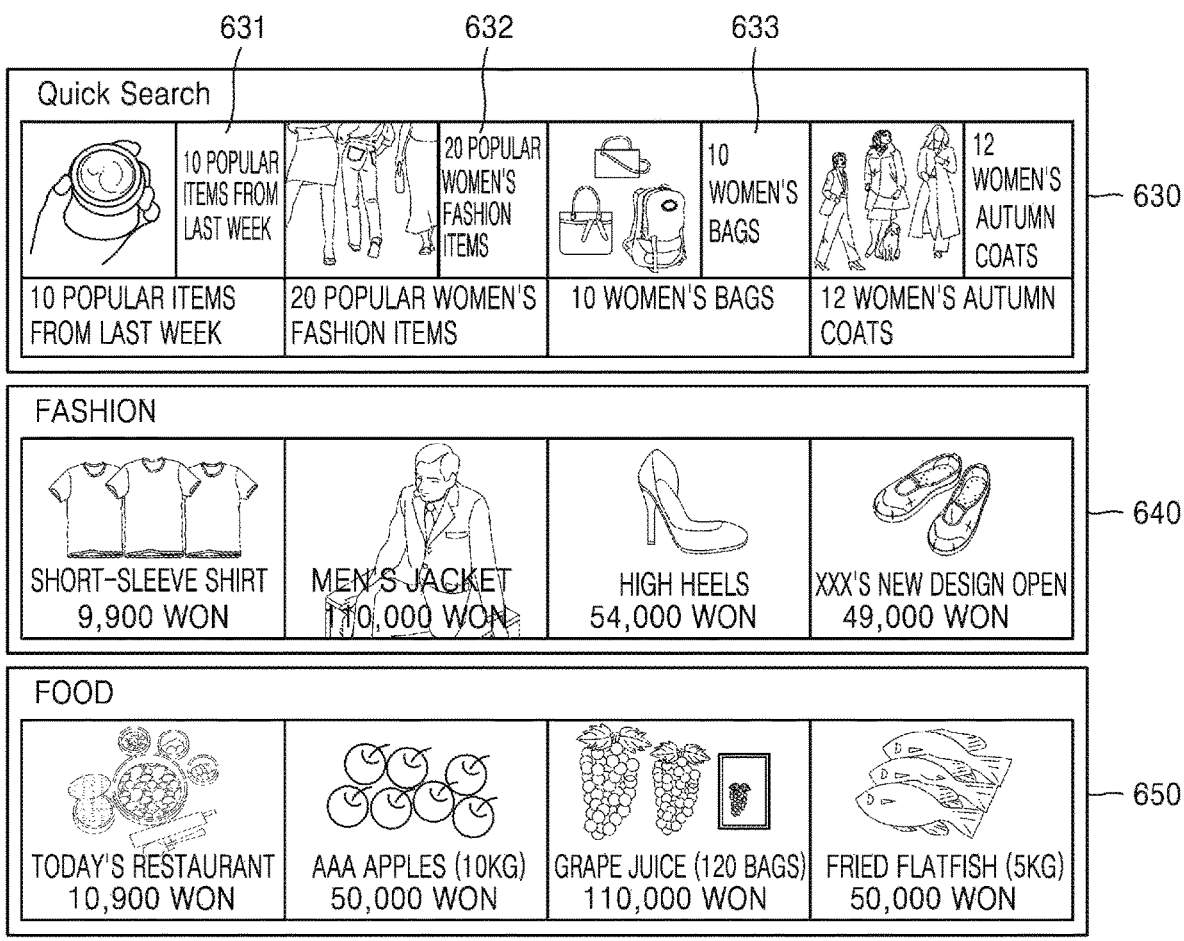

FIGS. 6A and 6B are views for explaining a product list output by the electronic device 100 according to an example embodiment.

The electronic device 100 according to an example embodiment may output a product list including a plurality of products. The product list may output a plurality of product lists according to an example embodiment.

For example, referring to FIG. 6A, the product list may include a first list 600 including products currently being displayed on a plurality of home shopping broadcast channels. The electronic device 100 may output the first list 600 using thumbnails representing respective products. Furthermore, the first list 600 may include information about at least one of a name, a price, and a home shopping broadcast channel name of each product being displayed.

Furthermore, referring to FIG. 6A, the product list may further include second lists 610 and 611 including a plurality of products which are sequentially broadcast on each home shopping broadcast channel. For example, a home shopping broadcast channel that a user can view may include the A home shopping channel and the B home shopping channel. The electronic device 100 may separately output the list 610 including products broadcast on the A home shopping channel and the list 611 including products broadcast on the B home shopping channel. The second lists 610 and 611 may arrange products in a broadcast order.

Furthermore, referring to FIG. 6A, the electronic device 100 according to an example embodiment may output a list 620 including special offers. For example, the special offer may mean, but are not limited to, products that have been discounted at a specified rate or more.

The electronic device 100 according to an example embodiment may output a list including selected products according to a predetermined criterion. For example, referring to FIG. 6B, the electronic device 100 may output a list 630 including products selected according to a predetermined criterion, such as popular items from last week, popular women's fashion items, and women's bags. The number of products selected according to each criterion may vary according to an example embodiment. For example, as shown in FIG. 6B, the electronic device 100a may output a list including 10 popular items from last week 631, 20 popular women's fashion items 632, and 10 women's bags 633. If an external input for selecting the 10 popular items from last week 631 is received, the electronic device 100 may automatically display a clip image of home shopping broadcast content regarding the 10 popular items from last week 631. The clip image of the home shopping broadcast content is an image obtained by extracting an important part from the home shopping broadcast content, and may be a short image within several minutes (for example, three minutes). The important part of the home shopping broadcast content may be a description part of the product, which is a part that can influence a user's decision on whether or not to purchase the product, but is not limited thereto.

The electronic device 100 according to an example embodiment may output a list including products corresponding to a plurality of predetermined product categories. For example, the predetermined product categories may include, but are not limited to, clothing, cosmetics, food, sports, and daily necessities. For example, referring to FIG. 6B, the electronic device 100 may separately output a list 640 including a plurality of products corresponding to a fashion category and a list 650 including a plurality of products corresponding to a food category.

The electronic device 100 according to an example embodiment may determine an order in which a plurality of product lists are output, based on at least one of a user's viewing history and a user's purchase history. For example, when a user views the A home shopping channel more frequently than the B home shopping channel, the electronic device 100 may output a list of products broadcast on the A home shopping channel to the top of a list of products broadcast on the B home shopping channel. Furthermore, the electronic device 100 may output at the top a list of products corresponding to a product category having a high purchase rate of the user from among the plurality of predetermined product categories in consideration of the user's purchase history. In addition, when outputting a list of special offers, the electronic device 100 may first output a product corresponding to the product category having a high purchase rate of the user from among the special offers included in the list. For example, referring to FIG. 6B, when a user purchases a large number of products corresponding to a fashion category than products corresponding to a food category, the electronic device 100 may preferentially output a list of products corresponding to the fashion category than a list of products corresponding to the food category. Accordingly, the electronic device 100 allows a user to check home shopping broadcast content regarding a user's favorite product more quickly, in consideration of a user's viewing history and a user's purchase history.

Figure 7A:
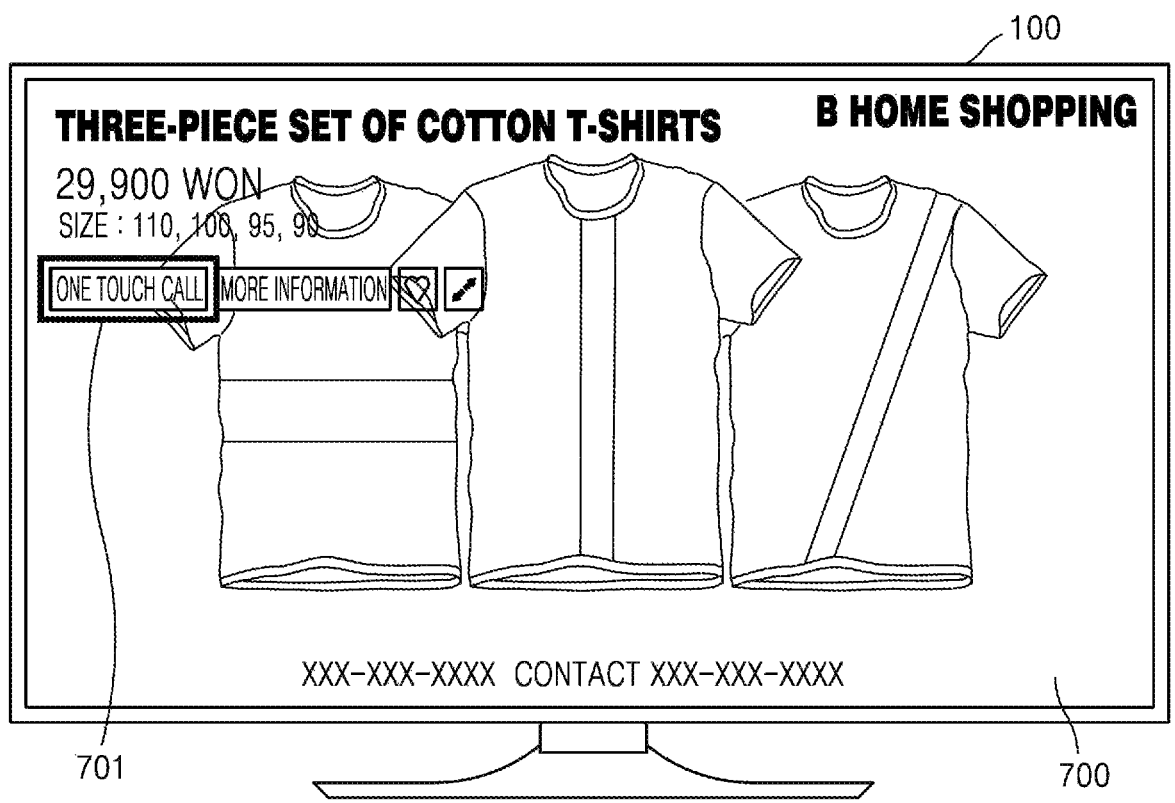
Figure 7B:
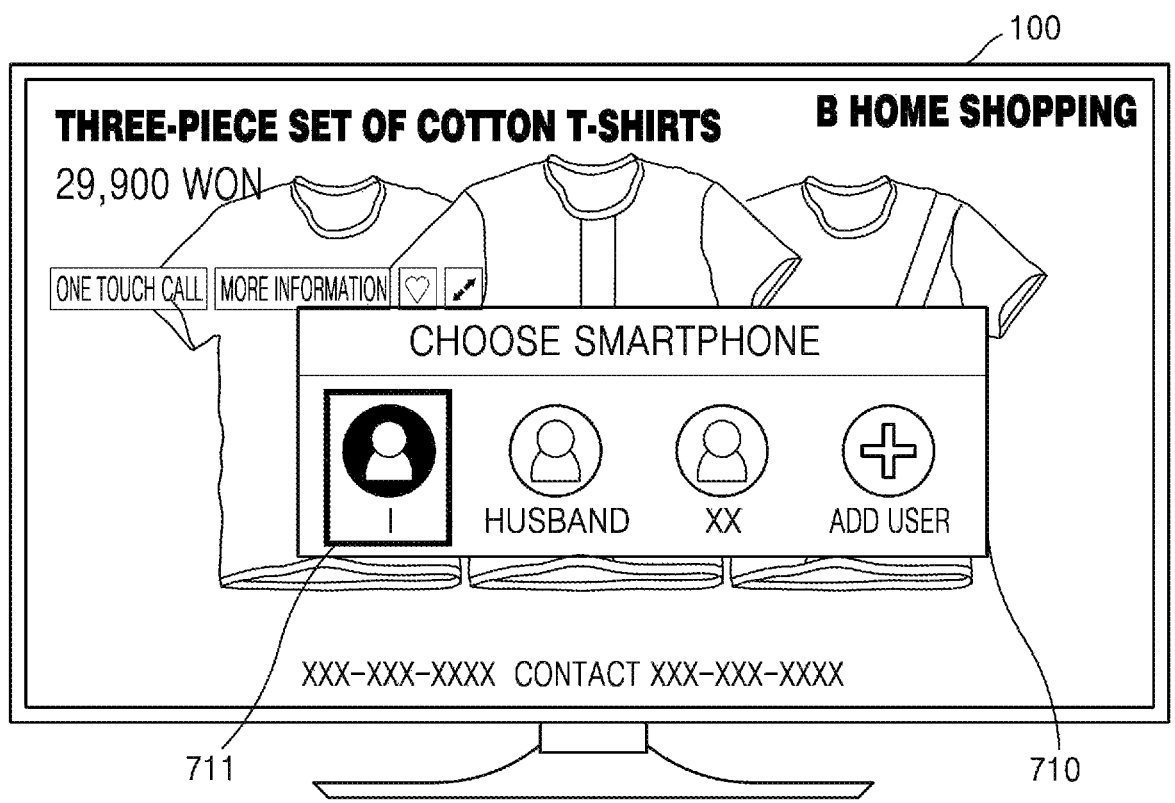
Figure 7B:
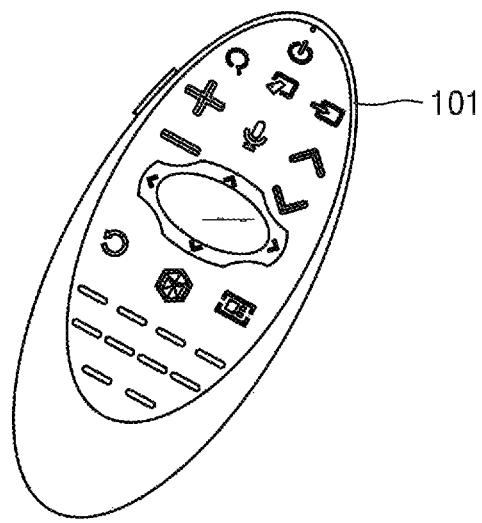

FIGS. 7A to 7C are views illustrating an example in which the electronic device 100 according to an example embodiment transmits a message requesting a telephone connection for purchasing a product.

The electronic device 100 according to an example embodiment may select an external device of a user to receive a telephone call in response to an external input for requesting a telephone connection for purchasing a product selected from a product list.

For example, referring to FIG. 7A, when home shopping broadcast content 700 related to a predetermined product (e.g., a three-piece set of cotton t-shirts) is output, a user may desire to purchase the product introduced in the home shopping broadcast content 700. Then, the electronic device 100 may allow the user to receive a telephone call for purchasing the product. The electronic device 100 may output a menu 701 requesting a telephone connection for purchasing the product. In response to an external input for selecting the menu 701 requesting a telephone connection, the electronic device 100 may determine an external device (e.g., a smartphone) to receive a telephone call. The external device to receive a telephone call may be a device registered in the electronic device 100 in advance. Alternatively, according to an example embodiment, the electronic device 100 may additionally register an external device in the electronic device 100 by inputting a telephone number of the external device.

The electronic device 100 according to an example embodiment may register a plurality of external devices. The electronic device 100 needs to determine which external device from among the plurality of registered external devices to receive a telephone call. For example, referring to FIG. 7B, the electronic device 100 may select (711) an external device to receive a telephone call from a list 710 including a plurality of external devices previously registered in the electronic device 100. When one external device is selected from the list 710 including a plurality of external devices, the electronic device 100 may transmit a message requesting a telephone connection to a home shopping broadcast content provider. The message requesting a telephone connection may include information about home shopping broadcast content viewed by a user, and information about an external device to receive a telephone call. For example, the information about home shopping broadcast content may include at least one of a name of a product introduced in the home shopping broadcast content, an ID for identifying the product, and an ID for identifying the home shopping broadcast content, but is not limited thereto. Furthermore, the information about the external device to receive a telephone call may include a telephone number of the external device.

Furthermore, referring to FIG. 7C, in response to an external input that selects (711) an external device from the list 710 including a plurality of external devices, the electronic device 100 may allow a selected external device 720 to receive a telephone call for purchasing a product. Thereby, the user does not need to directly make a telephone call to purchase a product. In addition, when home shopping broadcast content being viewed by a user introduces a product for which broadcast has ended, a process of making a telephone call to purchase the product for which broadcast has ended may be somewhat complicated. However, the electronic device 100 according to an example embodiment allows a user to easily purchase a desired product by selecting a menu requesting a telephone connection.

Figure 8A:
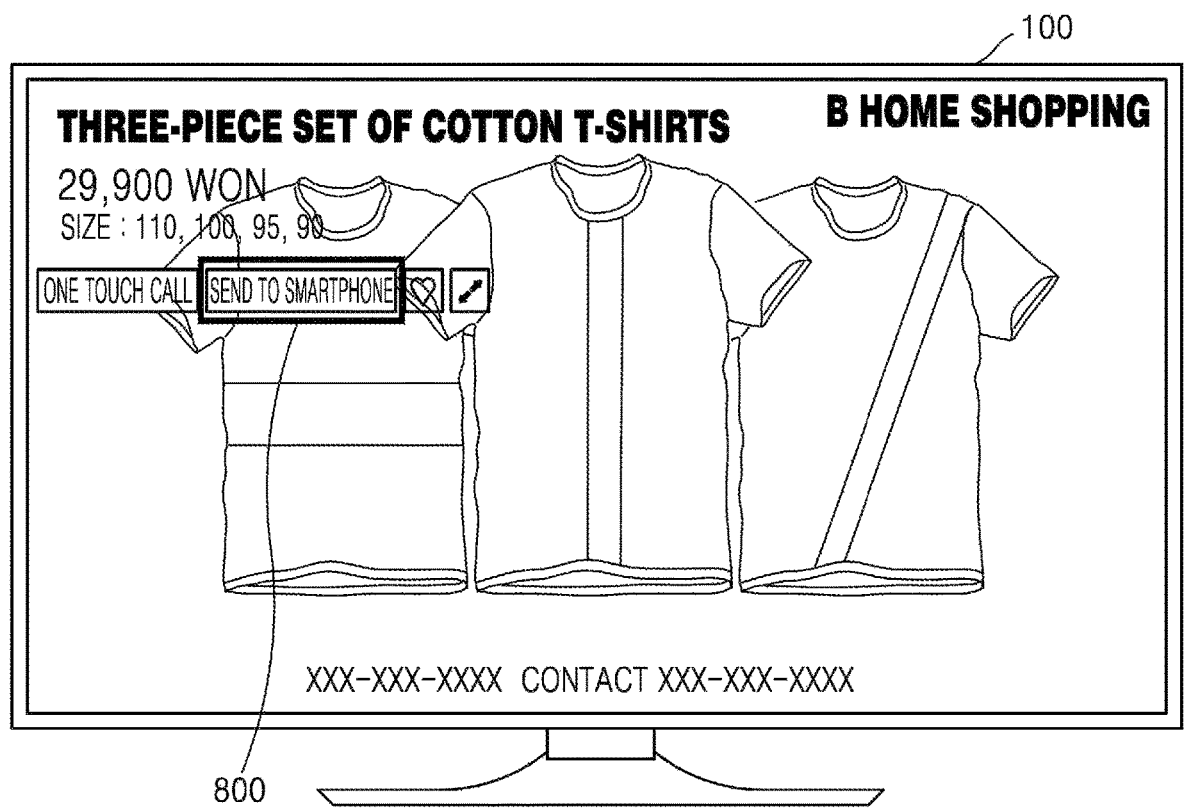
FIGS. 8A and 8B are views illustrating an example in which an electronic device according to an example embodiment transmits advertisement information about a selected product to an external device.
Figure 8A:
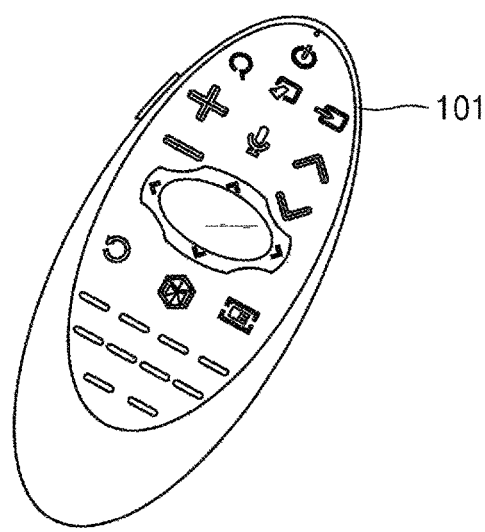
Figure 8B:
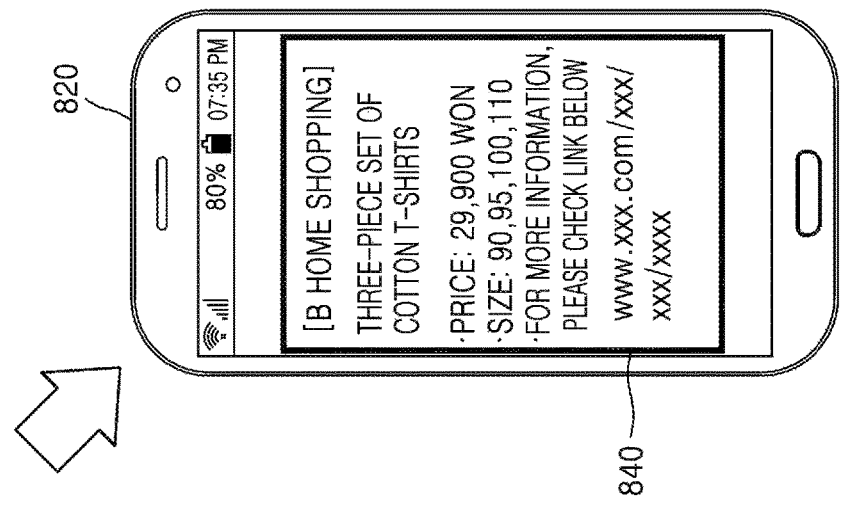
Figure 8B:
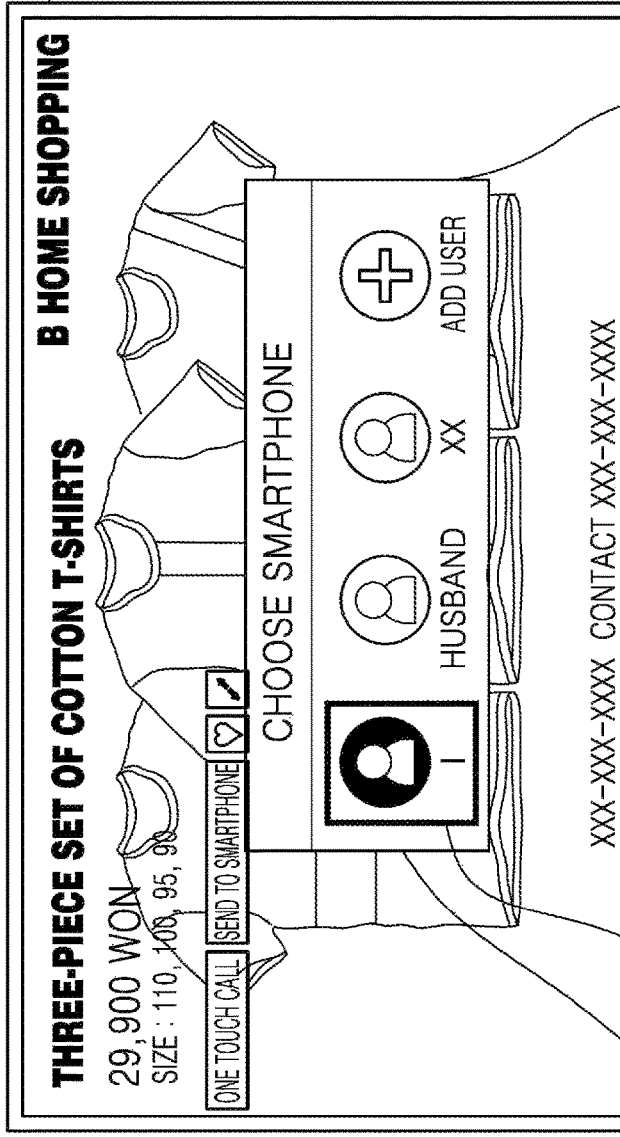
Figure 8B:
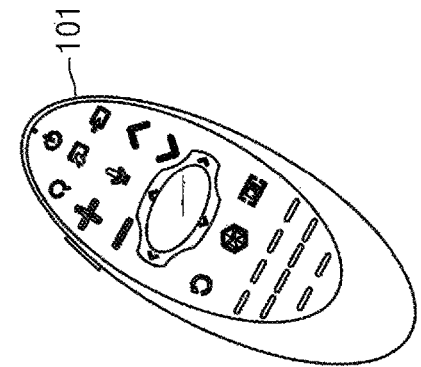

FIGS. 8A and 8B are views illustrating an example in which the electronic device 100 according to an example embodiment transmits advertisement information about a selected product to an external device.

The electronic device 100 according to an example embodiment may transmit a message including advertisement information about a product to a user's external device (e.g., a smartphone) in response to an external input for requesting the message. For example, as a product is selected from a product list, the electronic device 100 may output home shopping broadcast content regarding the selected product using streaming. A user may desire to receive advertisement information about a product introduced in the output home shopping broadcast content through an external device of the user. The advertisement information about the product may include, but is not limited to, at least one of a name, a price, a description of the product, and link information of a web page from which the product can be purchased.

For example, referring to FIG. 8A, the electronic device 100 may output home shopping broadcast content, and may further output a menu 800 to allow requesting a message including advertisement information about a product be sent. For example, the electronic device 100 may display a menu requesting a message with a predetermined icon described as "send to smartphone" as shown in FIG. 8A, but is not limited thereto.

The electronic device 100 according to an example embodiment may select an external device of a user, to which a message is to be transmitted, in response to an external input for selecting the menu 800 requesting a message. The electronic device 100 may store information (e.g., telephone numbers of external devices) related to a plurality of external devices previously registered in the electronic device 100. Then, the electronic device 100 may output a list representing the plurality of previously registered external devices. For example, referring to FIG. 8B, the electronic device 100 may output a list 810 representing the plurality of external devices previously registered in the electronic device 100. Then, the electronic device 100 may select (820) an external device, to which a message is to be transmitted, from the list 810.

Furthermore, the electronic device 100 may also transmit a message 840 including advertisement information about a product to a selected external device 830. Accordingly, the electronic device 100 transmits advertisement information about a product introduced through home shopping broadcast content being viewed by a user to the external device 830 so that the user may easily check advertisement information about a desired product through the external device 830.

Figure 9A:
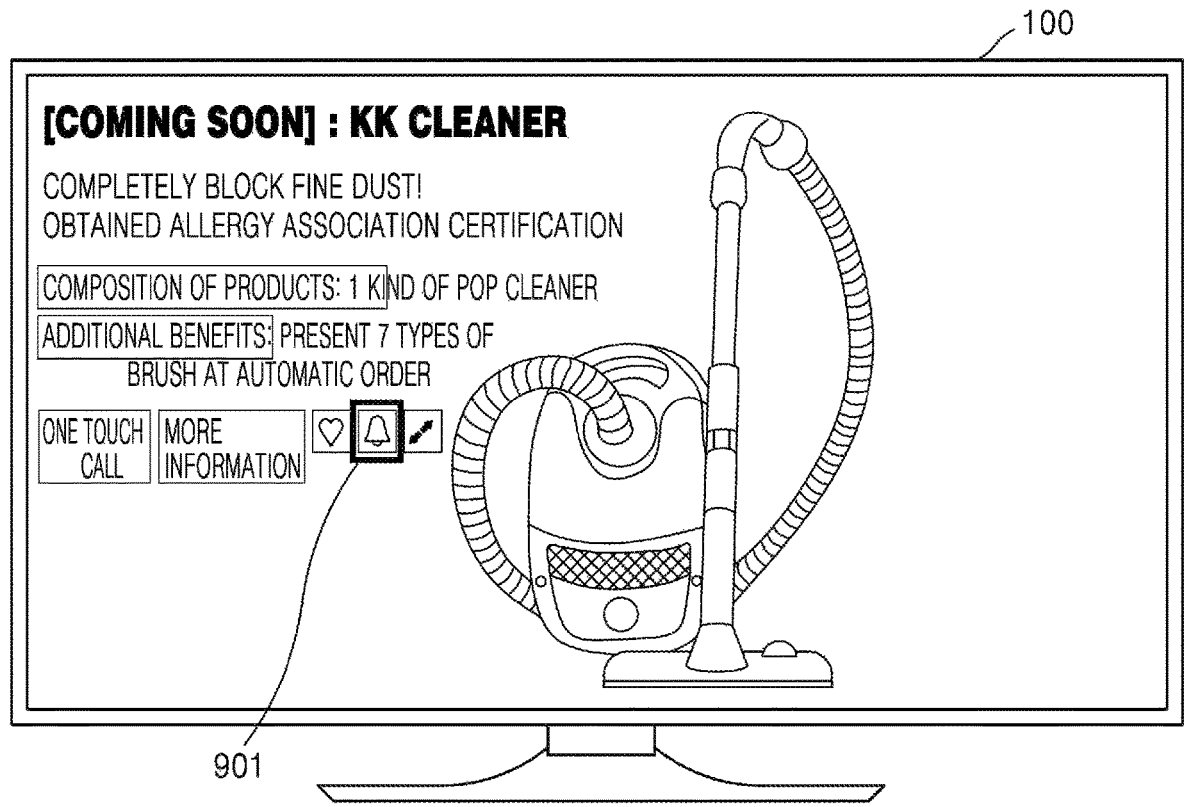
FIGS. 9A to 9C are views illustrating an example in which an electronic device according to an example embodiment sets a notification function.
Figure 9A:
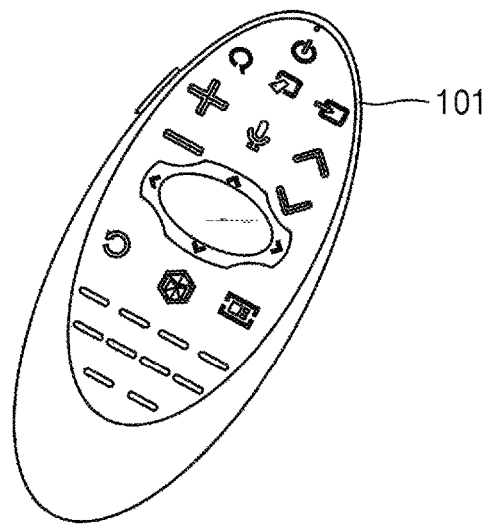
Figure 9B:
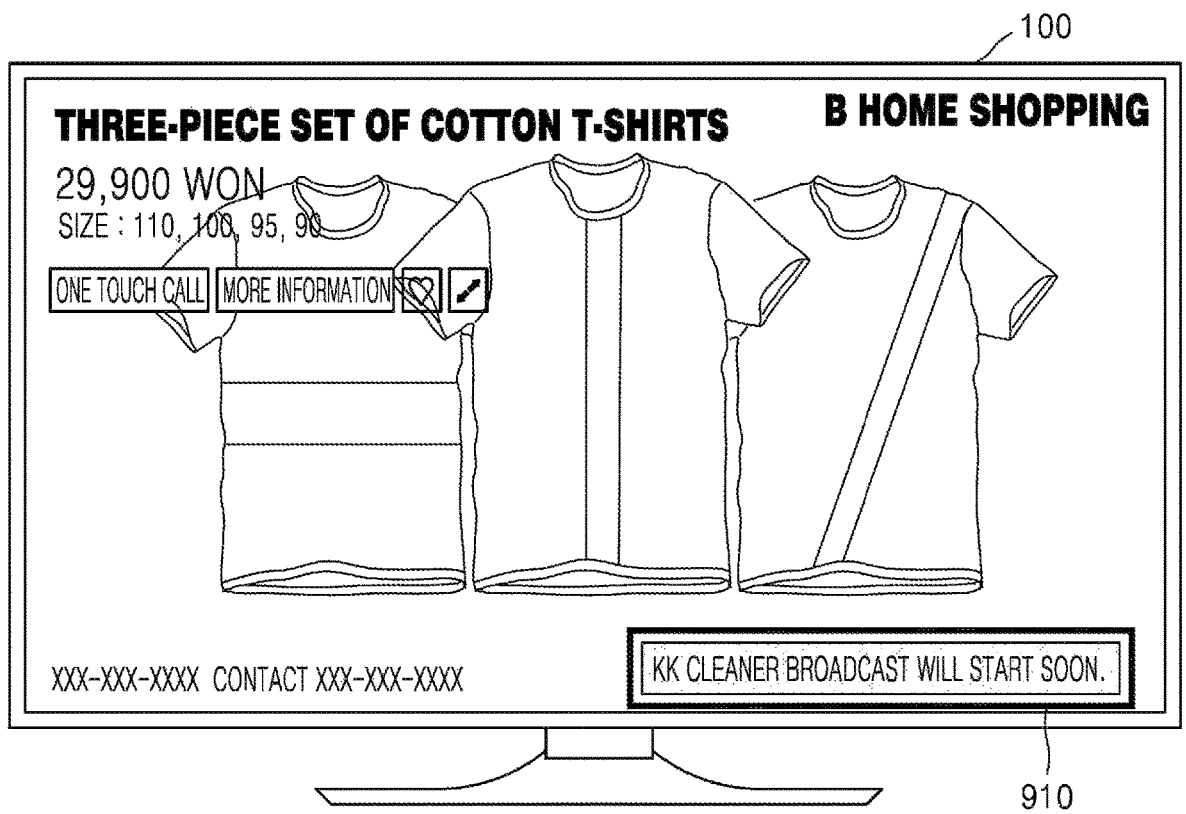
Figure 9B:
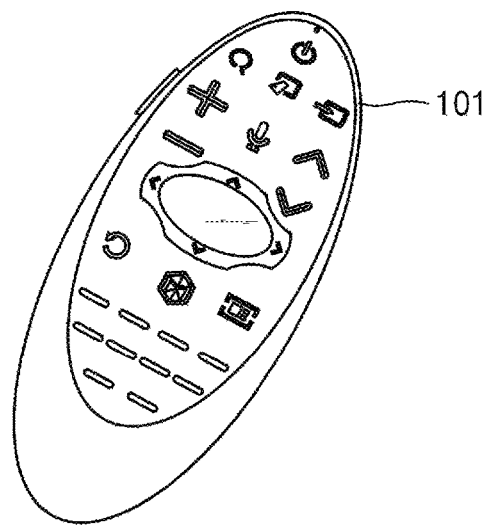
Figure 9C:
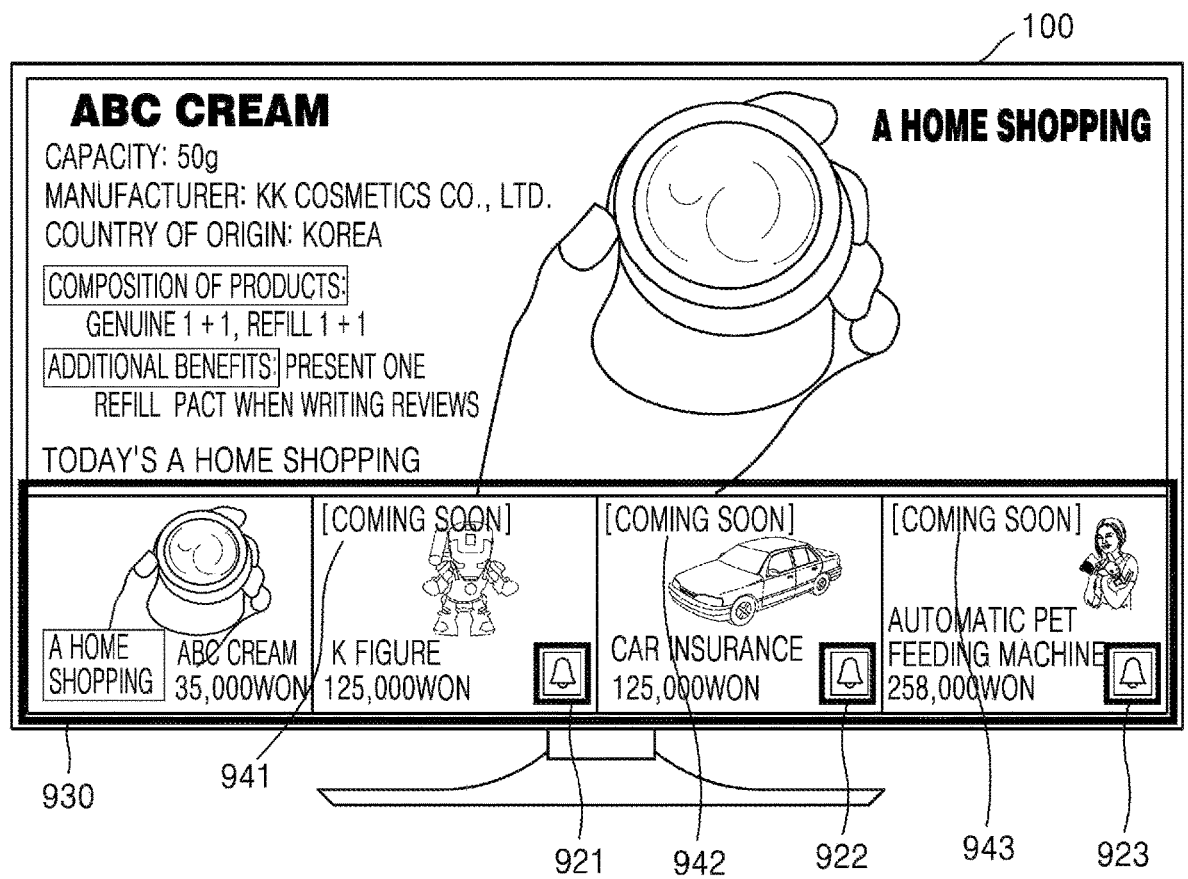
Figure 9C:
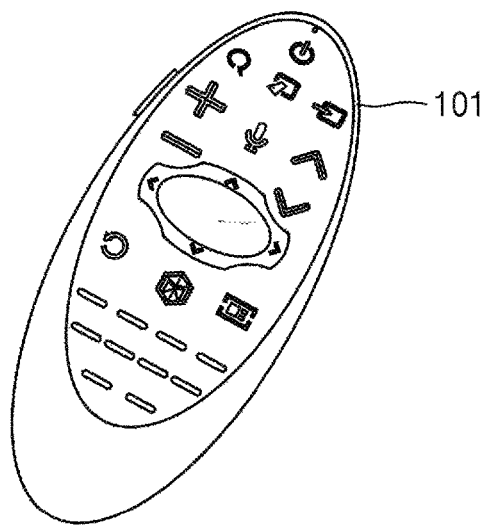

FIGS. 9A to 9C are views illustrating an example in which the electronic device 100 according to an example embodiment sets a notification function.

The electronic device 100 according to an example embodiment may set notification reception for a product desired by a user from among products to be broadcast. For example, the electronic device 100 may output a product list including a plurality of products, and the product list may include products to be broadcast. A user may select at least a product from among the products to be broadcast and set notification reception for the selected product. For example, referring to FIG. 9A, a user may desire to receive a notification message when home shopping broadcast on "KK cleaner" that has not yet been broadcast starts. The user may set notification reception for the "KK cleaner" by selecting a menu 901 for setting notification reception.

In addition, the electronic device 100 may output a notification message when the home shopping broadcast on "KK cleaner" starts in response to an external input for selecting the menu 901 for setting notification reception. For example, referring to FIG. 9B, the electronic device 100 may output a notification message 910 when the home shopping broadcast on "KK cleaner" starts, even when home shopping broadcast content regarding other products is being output. Further, when an external input for selecting the notification message 910 is received, the electronic device 100 may output the home shopping broadcast content regarding "KK cleaner".

In addition, the electronic device 100 according to an example embodiment may display a product for which notification reception is set in a distinguishable manner in the product list 930. For example, referring to FIG. 9C, the electronic device 100 may display the product for which notification reception is set in a distinguishable manner by using predetermined icons (e.g., bell-shaped icons) 921, 922, and 923 when outputting the product list 930 including a plurality of products, but is not limited thereto. Accordingly, the electronic device 100 may allow a user to easily check the product for which notification reception is set in the product list 930.

In addition, the electronic device 100 according to an example embodiment may distinguish a product to be broadcast from the product list 930. For example, referring to FIG. 9C, the electronic device 100 may output the product list 930 including products broadcast on the A home shopping broadcast channel. When "K figure", "car insurance", and "automatic pet feeding machine" are displayed as products that have not yet been broadcast in the product list 930, the electronic device 100 may display "K figure", "car insurance", and "automatic pet feeding machine" as products to be broadcast, but is not limited thereto. Further, the electronic device 100 may output information of products that are to be broadcast in the future by using identifiers 941, 942 and 943 as shown in FIG. 9C.

Figure 10:
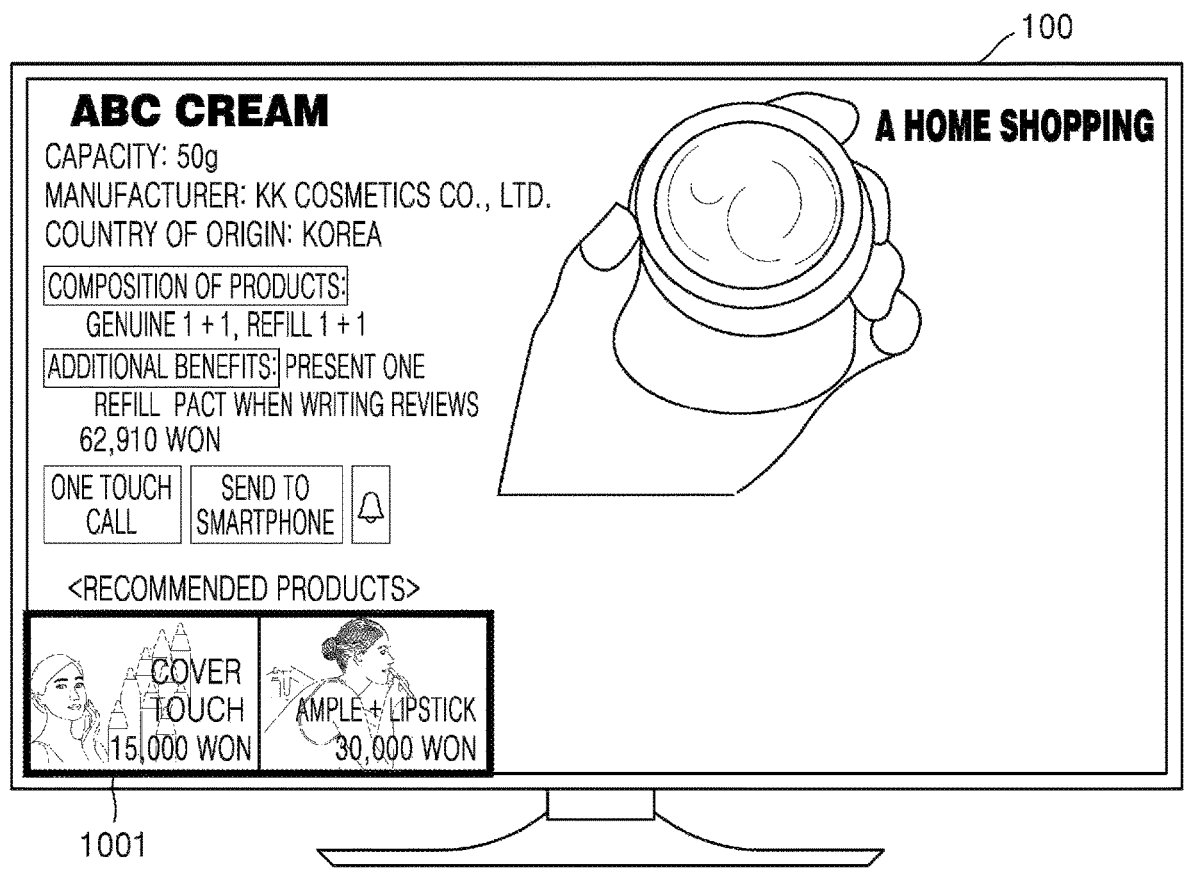
FIG. 10 is a view illustrating an example in which an electronic device according to an example embodiment outputs a recommended product from among products introduced in current home shopping broadcast content.

FIG. 10 is a view illustrating an example in which the electronic device 100 according to an example embodiment recommends a product similar to a product introduced in current home shopping broadcast content.

The electronic device 100 according to an example embodiment may recommend a product similar to a product introduced in home shopping broadcast content while outputting the home shopping broadcast content. The similar product may be a product in the same product category as the product introduced in the home shopping broadcast content or a product having the same name as the product introduced in the home shopping broadcast content but having a different detailed configuration, but is not limited thereto. For example, referring to FIG. 10, while outputting home shopping broadcast content regarding "ABC cream" in a cosmetics category, the electronic device 100 may recommend another product (e.g., "P concealer" or "ample+ lipstick") corresponding to the cosmetics category or a product 1001 having a name of "ABC cream" but different from the above "ABC cream" in a detailed configuration. When receiving an external input for selecting the recommended product 1001, the electronic device 100 may output home shopping content regarding the selected product using streaming.

Figure 11A:
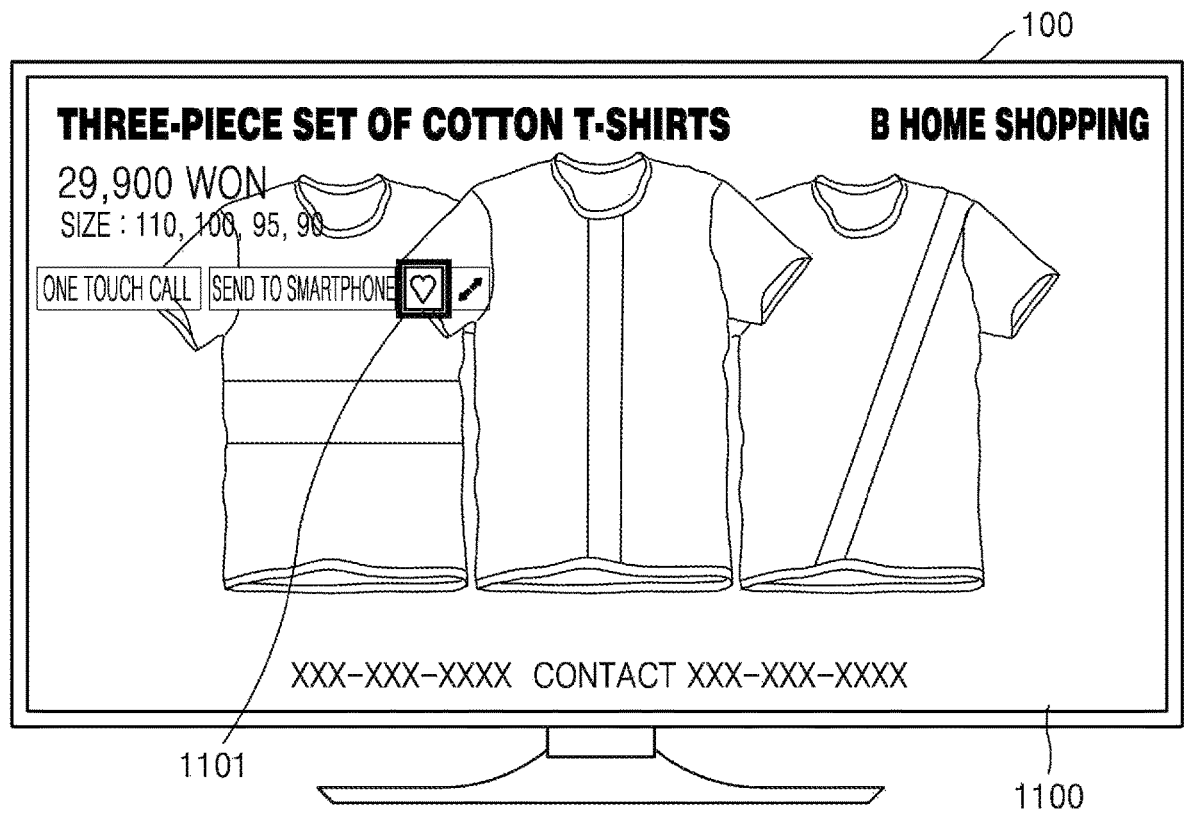
FIGS. 11A and 11B are views illustrating an example in which an electronic device according to an example embodiment sets a product of interest.
Figure 11A:
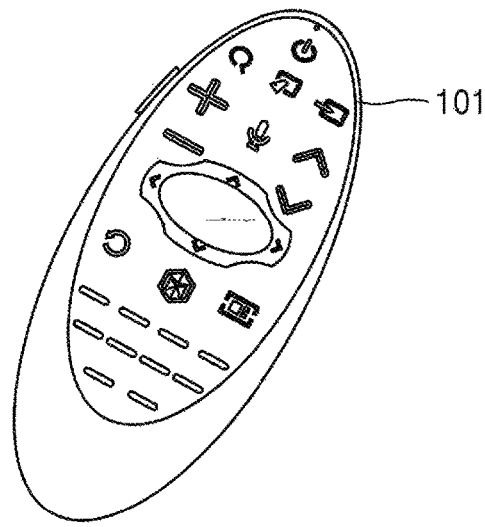
Figure 11B:
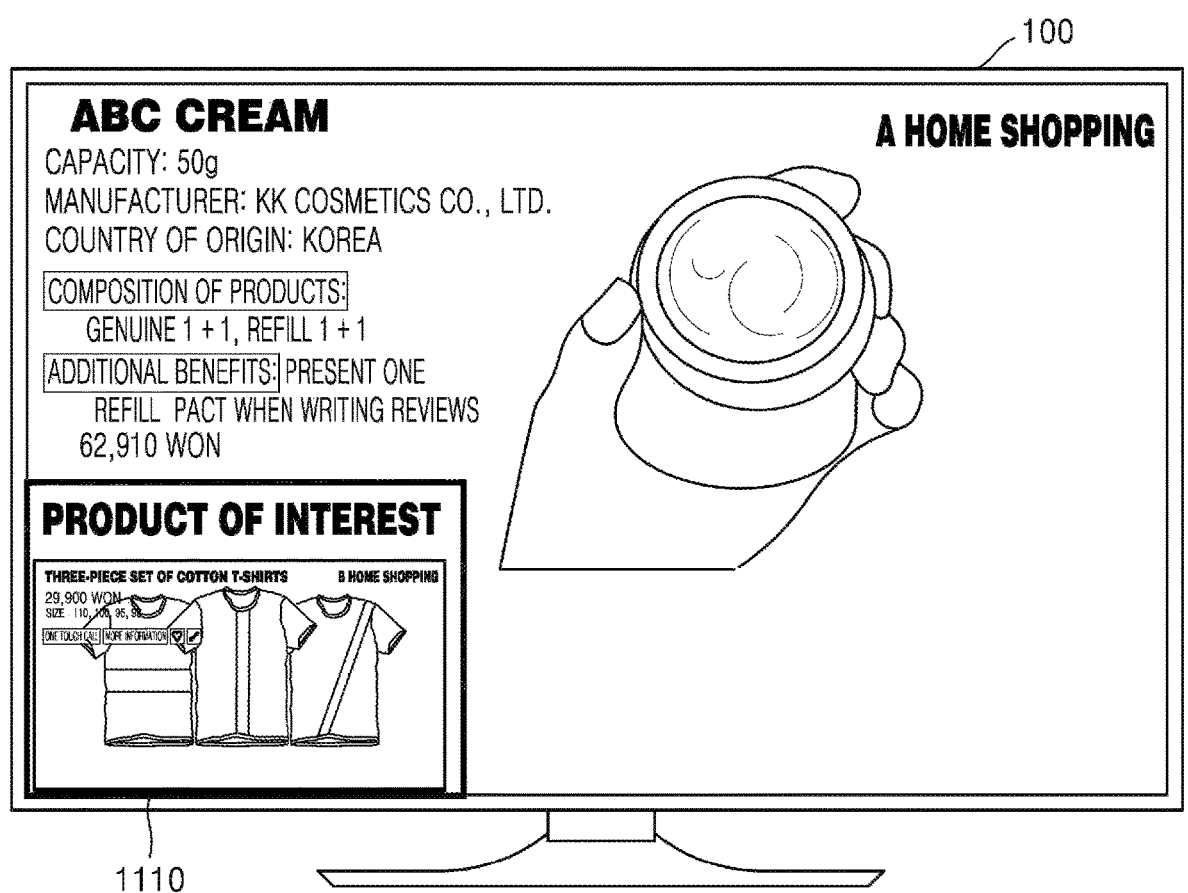

FIGS. 11A and 11B are views illustrating an example in which the electronic device 100 according to an example embodiment sets a product of interest.

The electronic device 100 according to an example embodiment may set products selected from among products introduced in pieces of home shopping broadcast content as products of interest. For example, referring to FIG. 11A, the electronic device 100 may output a menu 1101 for setting home shopping broadcast content 1100 as a product of interest while outputting the home shopping broadcast content 1100. For example, the menu 1101 for setting a product of interest may be displayed as a heart-shaped icon as shown in FIG. 11A. However, according to an example embodiment, the menu 1101 for setting a product of interest may be displayed as a text-shaped icon, but is not limited to thereto.

The electronic device 100 may set a product introduced through home shopping broadcast content 1100 as a product of interest in response to an external input for selecting the menu 1101 for setting a product of interest. For example, referring to FIG. 11A, the electronic device 100 may output the home shopping broadcast content 1100 on a three-piece set of cotton t-shirts. When receiving the external input for selecting the menu 1101 for setting a product of interest, the electronic device 100 may set the three-piece set of cotton t-shirts as a product of interest.

The electronic device 100 according to an example embodiment may output a product of interest list 1110 including one or more products set as a product of interest. For example, as shown in FIG. 11B, the electronic device 100 may output the product of interest list 1110 in a pop-up form on a partial area of a screen while outputting home shopping broadcast content regarding another product. In addition, the electronic device 100 may output the product of interest list 1110 using a thumbnail of the product as shown in FIG. 11B. The electronic device 100 may output a plurality of products included in the product of interest list 1110 on a single screen. Alternatively, according to an example embodiment, the electronic device 100 may output the products included in the product of interest list 1110 one by one on a single screen, and may output another product included in the product of interest list 1110 when an external input for changing products is received.

In addition, according to an example embodiment, the electronic device 100 may output the product of interest list 1110 only when an external input for requesting the product of interest list 1110 is received.

Figure 12:
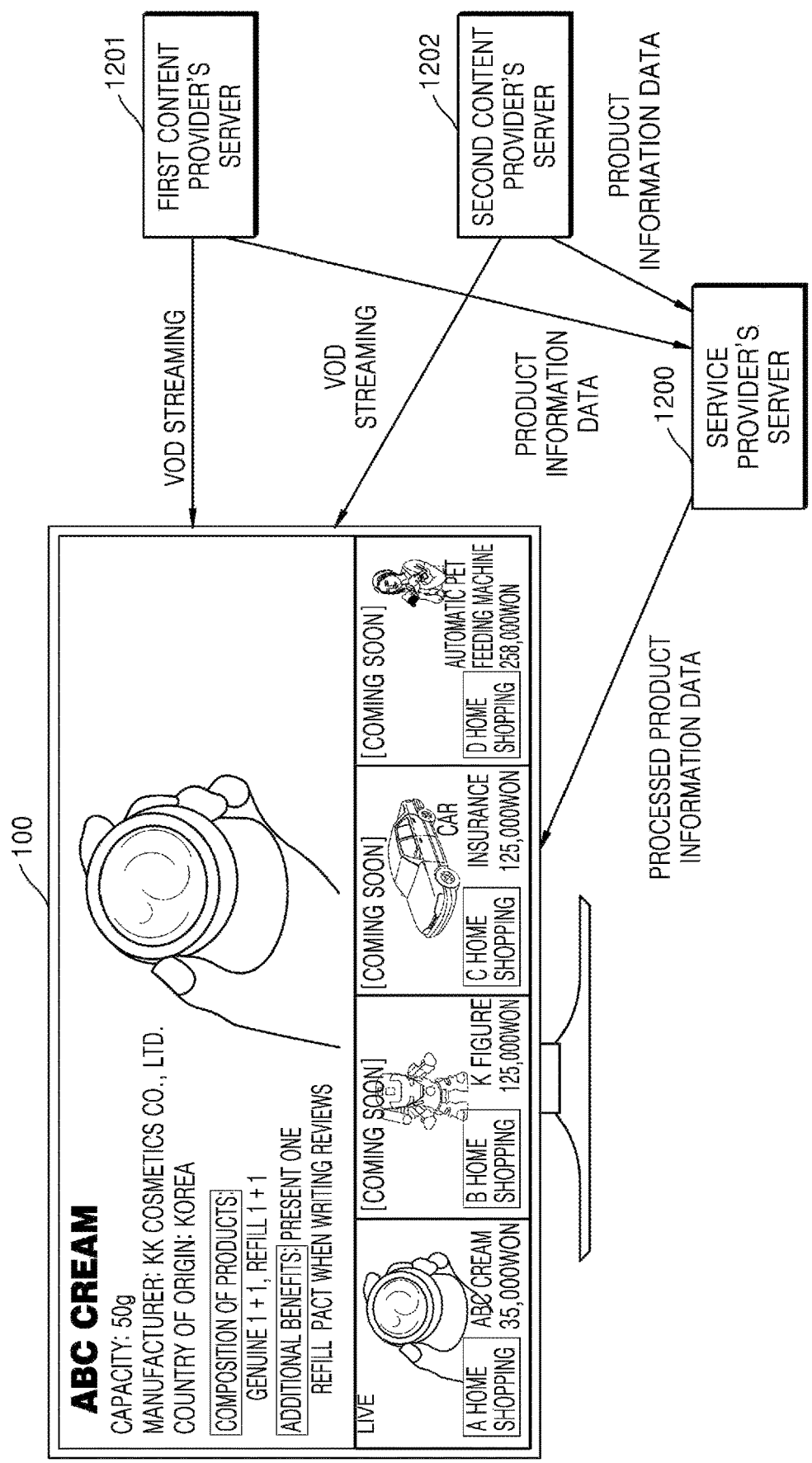
FIG. 12 is a view of a relationship of devices used to implement an operating method of an electronic device, according to an example embodiment.

FIG. 12 is a view of a relationship of devices used to implement an operating method of the electronic device 100 according to an example embodiment.

Servers of a content provider, such as first and second content provider's servers 1201 and 1202, according to an example embodiment may store pieces of home shopping broadcast content produced by each home shopping broadcast content provider. A home shopping broadcast content provider may be a person who produces home shopping broadcast content for advertisement or sale of a product and provides the content to a user. For example, the home shopping broadcast content provider may include, but is not limited to, a shopping broadcaster or a company providing a home shopping broadcast VOD service. In FIG. 12, for convenience of explanation, a case where the content provider has two servers (the server 1201 of a first content provider and the server 1202 of a second content provider) will be described as an example. For example, the server 1201 of the first content provider may store home shopping broadcast content generated by home shopping company X, and the server 1202 of the second content provider may store home shopping broadcast content generated by home shopping company Y, but the present disclosure is not limited thereto.

A server 1200 of the service provider according to an example embodiment may receive and store advertisement information about a product from the servers 1201 and 1202 of the content provider. In addition, the server 1200 of the service provider may process advertisement information about a stored product and provide the processed advertisement information to the electronic device 100. The server 1200 of the service provider processes the advertisement information about the product received from the servers 1201 and 1202 of the content provider so that the electronic device 100 may more effectively output the advertisement information about the product. Accordingly, the electronic device 100 may output home shopping broadcast content stored on the servers 1201 and 1202 of the content provider using streaming, and may receive the advertisement information about the product from the server 1200 of the service provider to output the advertisement information.

Figure 13:
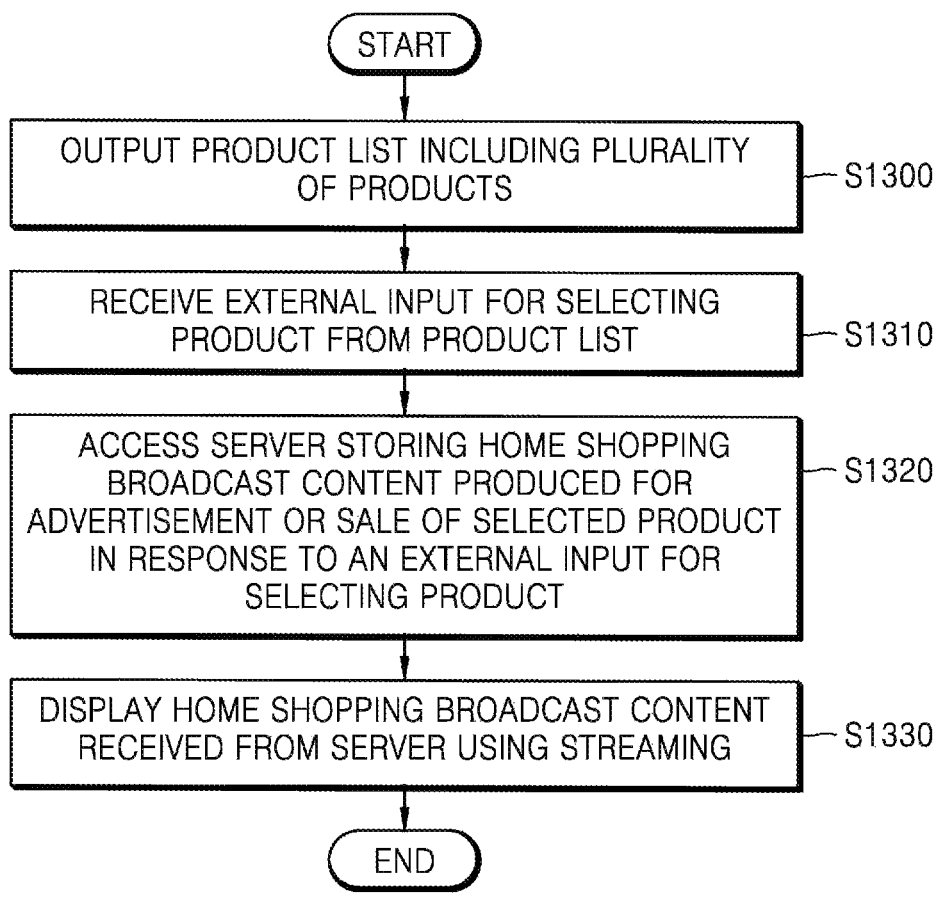
FIG. 13 is a flowchart illustrating an operating method of an electronic device according to an example embodiment.

FIG. 13 is a flowchart illustrating an operating method of the electronic device 100 according to an example embodiment.

In operation S1300, the electronic device 100 outputs a product list including a plurality of products while a broadcast program for advertisement or sale of a product is being displayed. The broadcast program for advertisement or sale of a product may include, but is not limited to, a home shopping broadcast program or a program for providing information about a recommended product. The product list including a plurality of products may include a product advertised or sold through home shopping broadcast content. For example, the product list may include a first list including products currently being displayed on a plurality of home shopping broadcast channels, and may include at least one of a second list including products that are sequentially broadcast on each home shopping broadcast channel, a third list including products corresponding to a predetermined product category, and a fourth list including products selected according to a predetermined criterion from among products that have been broadcast.

Furthermore, when a plurality of product lists are output, the electronic device 100 according to an example embodiment may determine an order in which a plurality of product lists are output and may output the plurality of product lists in the determined order, based on at least one of a user's viewing history and a user's purchase history.

Furthermore, the electronic device 100 according to an example embodiment may output a product list using a thumbnail of each product, and may further output information about at least one of a name, a price, and a home shopping broadcast channel name of each product along with the thumbnail.

Furthermore, the electronic device 100 according to an example embodiment may output a menu for executing an application for providing information about home shopping broadcast content when a user watches a home shopping broadcast program or a predetermined broadcast program. The electronic device 100 may execute the application in response to an external input for selecting the output menu. Furthermore, the electronic device 100 may output a product list including a plurality of products as the application is executed.

In operation S1310, the electronic device 100 may receive an external input for selecting a product from the product list. For example, the external input may include, but is not limited to, a user input to select a product from the product list using the control device 101.

In operation S1320, the electronic device 100 accesses a server storing home shopping broadcast content produced for advertisement or sale of the selected product in response to the external input for selecting a product. The home shopping broadcast content may be produced in advance by a home shopping broadcast content provider and stored on the server.

In operation S1330, the electronic device 100 may display the home shopping broadcast content received from the server by using streaming. Furthermore, the electronic device 100 may display home shopping broadcast content by using streaming and output advertisement information about a product at the same time. The advertisement information about a product may include at least one of a name, a price, a brand, and a description of the product. In addition, the advertisement information about the product may be stored on a server other than the server storing home shopping broadcast content.

The electronic device 100 according to an example embodiment, in response to an external input for requesting a message including advertisement information about a product selected from the product list, may transmit the message including advertisement information about the selected product to an external device. Also, the electronic device 100 may select an external device for receiving a telephone call in response to an external input for requesting a telephone connection for purchasing the selected product. The electronic device 100 may transmit a message requesting a telephone connection to the server so that the selected external device receives a telephone call to purchase the selected product.

The disclosed embodiments may be implemented as computer instructions which can be executed by various computer means, and recorded on a computer-readable medium. The computer-readable medium may include program instructions, data files, data structures or a combination thereof. Program instructions recorded on the medium may be particularly designed and structured for the present disclosure or available to those skilled in computer software. Examples of the computer-readable recording medium include magnetic media, such as a hard disc, a floppy disc, and a magnetic tape; optical media, such as a compact disc-read only memory (CD-ROM) and a digital versatile disc (DVD); magneto-optical media, such as floptical discs; a ROM; a RAM; and a flash memory. Program commands may include, for example, a high-level language code that can be executed by a computer using an interpreter, as well as a machine language code made by a complier.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. An electronic device comprising:
    a communication interface;
    a processor configured to:
       control the communication interface to access a server for information of at least one product stored on the server, the information of the at least one product including at least one list corresponding to a plurality of products including the at least one product;
       stream the information of the at least one product from the server,
       output the information of the at least one product while a broadcast program for advertisement or sale of the at least one product is being displayed on a home shopping broadcast channel,
       determine an order in which the at least one list is output on a display based on at least one of a user's viewing history or a user's purchase history,
       control the display to display the at least one list according to the determined order;
       control, in response to an external input for a selection from the information of the at least one product streamed, the communication interface to access the server for shopping broadcast content produced for advertisement or sale stored on the server corresponding to the selection from the information of the at least one product, and
       stream the shopping broadcast content, corresponding to the selection from the information of the at least one product, received from the server; and
    an external input interface configured to receive the external input,
    wherein the at least one list includes information of the plurality of products currently being displayed on a plurality of home shopping broadcast channels.

2. The electronic device of claim 1, wherein the electronic device comprises the display, and
    the processor is further configured to:
       control the display to display the shopping broadcast content by using streaming.

3. The electronic device of claim 1,
    wherein the at least one list is a first list and further comprises a second list including information of products that are sequentially broadcast on each home shopping broadcast channel, a third list including information of products corresponding to one or more predetermined product categories, and a fourth list including information of products selected according to a predetermined criterion from among products that have been broadcast.

4. The electronic device of claim 1, wherein the processor is further configured to:
    control the communication interface to access the server for advertisement information stored on the server corresponding to the selection; and
    receive and output the advertisement information corresponding to the selection from the server.

5. The electronic device of claim 1, wherein the processor is further configured to:
    select an external device to receive a telephone call in response to the external input which includes a request for a telephone connection for a purchase through the external input interface according to the selection; and
    control the communication interface to transmit a message requesting the telephone connection to a home shopping broadcast content provider so that the selected external device receives the telephone call for the purchase according to the selection.

6. The electronic device of claim 1, wherein
    the processor, in response to a request for a message including advertisement information associated with the selection through the external input interface, is configured to control the communication interface to transmit the message to an external device.

7. The electronic device of claim 1, wherein
    the processor, in response to an input selecting the at least one product or another product to be subject of a broadcast from the information of the at least one product through the external input interface, is configured to output a notification message when broadcast involving the at least one product or the other product starts.

8. The electronic device of claim 1, wherein
    the processor is configured to output the information of the at least one product using a thumbnail, and output information about at least one of a name, a price, and a home shopping broadcast channel name of the at least one product along with the thumbnail.

9. The electronic device of claim 1, wherein
    the processor is configured to execute an application in response to selecting of an application providing information about home shopping broadcast content through the external input interface, and output the information of the at least one product as the application is executed.

10. The electronic device of claim 9, wherein the processor is configured to:
    output a menu to execute an application providing information about home shopping broadcast content when a user watches a home shopping broadcast program or a predetermined broadcast program, and
    execute the application in response to selecting of the output menu through the external input interface.

11. An operating method of an electronic device, the operating method comprising:
    accessing a server for information of at least one product stored on the server;

streaming the information of the at least one product from the server, the information of the at least one product including at least one list corresponding to a plurality of products including the at least one product;

outputting the information of the at least one product while a broadcast program for advertisement or sale of the at least one product is being displayed on a home shopping broadcast channel;

determining an order in which the at least one list is output on a display based on at least one of a user's viewing history or a user's purchase history, controlling the display to display the at least one list according to the determined order;

receiving, by the electronic device, an external input for a selection from the information of the at least one product output;

accessing, in response to the external input, by the electronic device, the server for shopping broadcast content produced for advertisement or sale stored on the server corresponding to the selection from the information of the at least one product; and streaming, by the electronic device, the shopping broadcast content corresponding to the selection from the information of the at least one product received from the server, wherein the at least one list includes information of the plurality of products currently being displayed on a plurality of home shopping broadcast channels.

12. The operating method of claim 11,
wherein the at least one list is a first list and further comprises a second list including information of products that are sequentially broadcast on each home shopping broadcast channel, a third list including information of products corresponding to one or more predetermined product categories, and a fourth list including information of products selected according to a predetermined criterion from among products that have been broadcast.

13. The operating method of claim 11, further comprising:
accessing the server for advertisement information stored on the server corresponding to the selection; and
receiving and outputting the advertisement information corresponding to the selection product from the server.

14. The operating method of claim 11, further comprising:
receiving a request for a telephone connection for a purchase according to the selection,
selecting an external device to receive a telephone call in response to the request for the telephone connection, and
transmitting a message requesting a telephone connection to a home shopping broadcast content provider so that the selected external device receives the telephone call for the purchase according to the selection.

15. The operating method of claim 11, further comprising:
receiving a request for a message including advertisement information associated with the selection, and
transmitting the message to an external device in response to the request for the message.

16. The operating method of claim 11, further comprising:
receiving an input selecting the at least one product or another product to be subject of a broadcast from the information of the at least one product, and
outputting, in response to the input, a notification message when home shopping broadcast involving the at least one product or the other product starts.

17. The operating method of claim 11, further comprising:
receiving an input for selecting an application for providing information about home shopping broadcast content,
executing the application in response to the input for selecting the application; and
outputting the information of the at least one product as the application is executed.

18. A non-transitory computer-readable recording medium having recorded thereon a program for executing the operating method of the electronic device of claim 11.

19. An electronic device comprising:
a communication interface;
a display;
an external input interface configured to receive an external input; and
a processor configured to:
control the display to display a broadcast program for advertisement or sale of a first product on a first home shopping broadcast channel;
control the display to display a menu to execute an application providing information of at least a second product other than the first product while the broadcast program is being displayed;
execute the application, in response to selecting of the menu through the external input interface; and
determine an order in which the information of the at least second product is displayed on the display based on at least one of a user's viewing history or a user's purchase history,
control the display to display the information of the at least a second product other than the first product with the broadcast program according to the determined order,
wherein, the at least second product is currently being displayed on a broadcast program for advertisement or sale on at least one home shopping broadcast channel other than the first home shopping channel.

* * * * *